(12) United States Patent
Buck et al.

(10) Patent No.: US 9,625,262 B2
(45) Date of Patent: Apr. 18, 2017

(54) SMOOTHED NAVIGATION SOLUTION USING FILTERED RESETS

(71) Applicant: Honeywell International Inc.

(72) Inventors: Timothy Merrill Buck, Oakdale, MN (US); Lawrence Charles Vallot, Lake Elmo, MN (US); Scott I. Snyder, Mahtomedi, MN (US)

(73) Assignee: Honeywell International Inc., Morris Plains, NJ (US)

( * ) Notice: Subject to any disclaimer, the term of this patent is extended or adjusted under 35 U.S.C. 154(b) by 264 days.

(21) Appl. No.: 13/660,396

(22) Filed: Oct. 25, 2012

(65) Prior Publication Data

US 2014/0121963 A1    May 1, 2014

(51) Int. Cl.
G01C 21/16    (2006.01)

(52) U.S. Cl.
CPC ........... G01C 21/16 (2013.01); G01C 21/165 (2013.01)

(58) Field of Classification Search
CPC ....... G01C 21/165; G01C 21/16; G01S 19/47; G01S 5/02; G08G 1/205; G08G 1/20; B60R 25/102; B60R 25/33
USPC ................... 701/202, 480; 455/457; 340/988
See application file for complete search history.

(56) References Cited

U.S. PATENT DOCUMENTS

| 5,590,043 | A | 12/1996 | McBurney | |
|---|---|---|---|---|
| 6,037,893 | A | 3/2000 | Lipman | |
| 6,205,401 | B1 * | 3/2001 | Pickhard et al. | 701/480 |
| 6,278,945 | B1 | 8/2001 | Lin | |
| 6,415,223 | B1 | 7/2002 | Lin et al. | |
| 6,522,266 | B1 * | 2/2003 | Soehren et al. | 340/988 |
| 6,631,323 | B2 | 10/2003 | Tucker | |
| 6,641,090 | B2 | 11/2003 | Meyer | |
| 7,162,367 | B2 | 1/2007 | Lin et al. | |

(Continued)

FOREIGN PATENT DOCUMENTS

EP        2725322        4/2014

OTHER PUBLICATIONS

Buck et al., "Declaration of Timothy Merrill Buck, Lawrence Charles Vallot, and Scott I Snyder under 37 C.F.R. 1.132", declaration dated Oct. 25, 2012, Published in: US, pp. 13.

(Continued)

*Primary Examiner* — Adam Tissot
*Assistant Examiner* — Aaron Smith
(74) *Attorney, Agent, or Firm* — Fogg & Powers LLC

(57) ABSTRACT

A navigation system includes at least one inertial sensor configured to detect motion of the system and generate inertial data; at least one aiding device configured to generate aiding device measurement data; at least one processing unit configured to generate an un-smoothed navigation solution inclusive of navigation state variable error resets based on the inertial data and the aiding device measurement data; wherein the at least one processing unit is further configured to sum the state variable error resets into a cumulative sum of the state variable error resets; wherein the at least one processing unit is further configured to high pass filter the cumulative sum of the state variable error resets; and wherein the at least one processing unit is further configured to subtract the high pass filtered cumulative sum of the state variable error resets from the un-smoothed navigation solution to generate a smoothed navigation solution.

20 Claims, 12 Drawing Sheets

(56) References Cited

U.S. PATENT DOCUMENTS

| | | | |
|---|---|---|---|
| 7,643,939 | B2 | 1/2010 | Zeng et al. |
| 7,739,045 | B2 | 6/2010 | Thompson, Jr. |
| 7,855,678 | B2 | 12/2010 | Scherzinger et al. |
| 7,873,472 | B2 | 1/2011 | Zeng et al. |
| 7,890,260 | B2 | 2/2011 | Ring |
| 8,024,119 | B2 | 9/2011 | Zeng et al. |
| 8,209,121 | B1 | 6/2012 | Ogale |
| 8,401,571 | B2 * | 3/2013 | Naukkarinen et al. ....... 455/457 |
| 2002/0111717 | A1 | 8/2002 | Scherzinger et al. |
| 2004/0267444 | A1 * | 12/2004 | Coatantiec et al. .......... 701/202 |
| 2009/0093959 | A1 | 4/2009 | Scherzinger et al. |
| 2012/0035823 | A1 | 2/2012 | Carter et al. |

OTHER PUBLICATIONS

Gade, "Introduction to Inertial Navigation and Kalman Filtering", Jun. 9, 2008, pp. 1-61, Publisher: FFI.

Lorga et al., "Flexed for Flight: Tightly Coupled Integrated Nav System Adapts to Data Formats", Jun. 2005, pp. 27-34, Publisher: GPS World.

Liu, "Optimal Smoothing Techniques in Aided Inertial Navigation and Surveying Systems", "Reports No. 20298", Nov. 2009, pp. 1-184, Publisher: Schulich School of Engineering.

Haugen, "18.5: Estimating parameters and disturbances with Kalman Filter", "retrieved from http://home.hit.no/~hansha/documents/control/theory/kalmanfilter2.pdf", Aug. 2009, pp. 230-237.

Allotta et al., "Cooperative localization of a team of AUVs by a tetrahedral configuration", "Robotics and Autonomous Systems 62,", Apr. 12, 2014, pp. 1228-1237, Publisher: http://www.researchgate.net/profile/Enrico_Meli/publication/261564847_Cooperative_localization_of_a_team_of_AUVs_by_a_tetrahedral_configuration/links/54905d7a0cf225bf66a82be0.pdf.

Andersson et al., "Positioning and Navigation of a Robot Lawn Mover Using an ID-Marker", "retrieved from https://mangans84.files.wordpress.com/2010/06/report-positioning_and_navigation_of_a_robot_lawn_mover_using_an-id-marker.pdf", Jun. 9, 2010, pp. 1-33.

Beard, "UAVBook Supplement Direct and Indirect EKF", "retrieved from http://uavbook.byu.edu/lib/exe/fetch.php?media=shared:ekf_full_state.pdf", Nov. 18, 2014, pp. 1-11.

Bonin-Font et al., "Inertial Sensor Self-Calibration in a Visually-Aided Navigation Approach for a Micro-AUV", "Sensors 2015 retrieved from http://www.mdpi.com/1424-8220/15/1/1825/pdf", Jan. 16, 2015, pp. 1825-1860.

Buist, "Multi-Platform Integrated Positioning and Attitude Determination Using GNSS", "retrieved from http://repository.tudelft.nl/assets/uuid:fe74f9bb-2d6a-4416-92a8-144a5e12391e/PhDthesis_BUIST_20062013.pdf", Jun. 2013, pp. 1-308, Publisher: Delft University of Technology.

Cogill, "Event-Based Control Using Quadratic Approximate Value Functions", "retrieved from http://citeseerx.ist.psu.edu/viewdoc/download?doi=10.1.1.511.5153&rep=rep1&type=pdf", Dec. 15-18, 2009, pp. 1-7, Publisher: Dept. of Systems and Information Engineering, University of Virginia.

Haugen, "SCE1106 Control with Implementation", "retrieved from http://home.hit.no/~hansha/documents/control/theory/control_topics.pdf", Sep. 3, 2009.

Crassidis, "Sigma-Point Kalman Filtering for Integrated GPS and Inertial Navigation", "retrieved from http://www.acsu.buffalo.edu/~johnc/gps_ins06.pdf", Apr. 2006, pp. 1-11.

Di Ruscio et al., "State estimation and the Kalman filter", "retrieved from http://home.hit.no/~hansha/documents/control/theory/kalman_filter.pdf", Mar. 19, 2010, pp. 1-24.

Di Ruscio, "Model Predictive Control and optimization", "retrieved from http://home.hit.no/~hansha/documents/control/theory/mpc.pdf", Mar. 26, 2010, pp. 1-193.

Haugen, "Chapter 16: Estimation of model parameters", "retrieved from http://home.hit.no/~hansha/documents/control/theory/parameters_estimation.pdf", Aug. 2009, pp. 161-184.

Gade, "Introduction to Inertial Navigation", "retrieved from http://www.navlab.net/Publications/Introduction_to_Inertial_Navigation.pdf", Oct. 2009, pp. 1-20, Publisher: FFI.

Hall, "Attitude Estimation and Maneuvering for Autonomous Obstacle Avoidance by Miniature Air Vehicles", "retrieved from http://scholarsarchive.byu.edu/cgi/viewcontent.cgi?article=2690&context=etd", Dec. 22, 2008, pp. 1-129, Publisher: Brigham Young University.

Hepburn et al., "INS Reset Removal for Enhanced Post Flight Performance Analysis", "Position Location and Navigation Symposium. The 1990's—A Decade of Excellence in the Navigation Sciences", Mar. 20-23, 1990, pp. 226-230, Publisher: IEEE.

Kalgreadis et al., "Localization of the NTUA Emulator Space Robot Using a Discrete Extended Kalman Filter, Data Fusion & Feedback Delay Compensation", "retrieved from http://www.researchgate.net/profile/Iosif_Paraskevas/publication/236679870_Localization_of_the_NTUA_Emulator_Space_Robot_Using_a_Discrete_Extended_Kalman_Filter_Data_Fusion_Feedback_Delay_Compensation/links/00b7d5194ed89437ea000000.pdf?ev=pub_ext_doc_dl&origin=publication_detail&inViewer=true", Apr. 2013, pp. 1-7.

Kalman, "A New Approach to Linear Filtering and Prediction Problems", "Journal of Basic Engineering retrieved from http://www.cs.unc.edu/~welch/kalman/media/pdf/Kalman1960.pdf", Mar. 1, 1960, pp. 1-12.

Kleeman, "Understanding and Applying Kalman Filtering", "retrieved from http://biorobotics.ri.cmu.edu/papers/sbp_papers/integrated3/kleeman_kalman_basics.pdf", at least as early as Jun. 2013, pp. 1-37, Publisher: Department of Electrical and Computer Systems Engineering. Monash University.

Leach, "Low Cost Strapdown Intertial / GPS Integrated Navigation for Flight Test Requirements", "retrieved from http://ftp.rta.nato.int/public/PubFullText/RTO/MP/RTO-MP-043/$MP-043-17.PDF", May 24-26, 1999, pp. 17-1 to 17-12, Publisher: RTO SCI International Conference on 'Integrated Navigation Systems'.

Leishman et al., "A Multiplicative Extended Kalman Filter for Relative Rotorcraft Navigation", "retrieved from http://scholarsarchive.byu.edu/cgi/viewcontent.cgi?article=2298&context=facpub", Mar. 2013, pp. 1-11.

Markley, "Attitude Error Representations for Kalman Filtering", "retrieved from http://ntrs.nasa.gov/archive/nasa/casi.ntrs.nasa.gov/20020060647.pdf", Mar.-Apr. 2003, pp. 1-15, vol. 26, No. 2, Publisher: Journal of Guidance, Control, and Dynamics.

Mostafa et al., "GPS/IMU products—the Applanix approach", "Photogrammetric Week 01 retrieved from http://www.ifp.uni-stuttgart.de/publications/phowo01/Reid.pdf", 2001, pp. 63-83.

Riedel et al., "Guidance and Navigation in the Global Engagement Department", "Johns Hopkins APL Technical Digest retrieved from http://www.jhuapl.edu/techdigest/TD/td2902/Riedel.pdf", Jan. 2010, pp. 118-132, vol. 29, No. 2.

Sola, "Quaternion kinematics for the error-state KF", "retrieved from http://www.iri.upc.edu/people/jsola/JoanSola/objectes/notes/kinematics.pdf", Mar. 11, 2015, pp. 1-64.

Haugen, "Chapter 18: State estimation with Kalman Filter", "retrieved from http://home.hit.no/~hansha/documents/control/theory/stateestimation_with_kalmanfilter.pdf", Aug. 2009, pp. 213-239.

"Preliminary Lecture Notes on Chapter 3: State Estimation", "retrieved from http://www.cds.caltech.edu/~murray/wiki/images/b/b3/Stateestim.pdf", at least as early as Apr. 30, 2006, pp. 9-31.

Haugen, "Chapter 8: State estimation with Kalman Filter", "retrieved from http://home.hit.no/~hansha/documents/control/theory/kalmanfilterpdf",Nov. 3, 2007 , pp. 101-127.

Haugen, "Chapter 17: State estimation with observers", "retrieved from http://home.hit.no/~hansha/documents/control/theory/stateestimation_with_observers.pdf", Aug. 2009, pp. 185-212.

Weinberg et al., "Multilateration Software Development (Phase II)", "retrieved from http://www.dtic.mil/dtic/tr/fulltext/u2/914190.pdf", Sep. 1973, pp. 1-445.

Welch et al., "An Introduction to the Kalman Filter", "retrieved from http://www.cs.unc.edu/~tracker/media/pdf/SIGGRAPH2001_CoursePack_08.pdf", 2001, pp. 1-81, Publisher: SIGGRAPH 2001, Course 8, ACM Inc.

(56) References Cited

OTHER PUBLICATIONS

Welch et al., "An Introduction to the Kalman Filter", "retrieved from http://www.cs.unc.edu/~welch/media/pdf/kalman_intro.pdf", Jul. 24, 2006, pp. 1-16.
Control Theory web page, available at: http://home.hit.no/~hansha/documents/control/theory/control_theory.htm, at least as early as Sep. 13, 2010.
European Patent Office, "Office Action from EP Application No. 13186785.5 mailed Apr. 19, 2016", "from Foreign Counterpart of U.S. Appl. No. 13/660,396", Apr. 19, 2016, pp. 18, Published in: EP.
European Patent Office, "European Search Report from EP Application No. 13186785.5 mailed Apr. 1, 2016", "from Foreign Counterpart of U.S. Appl. No. 13/660,396", Apr. 1, 2016, pp. 1-5, Published in: EP.
El-Shimey et al., "Kalman Filter Face-Off Extended vs. Unscented Kalman Filters for Integrated GPS and MEMS Intertial", "www.insidegnss.com", Mar. 1, 2006, pp. 48-54, Publisher: InsideGNSS, Published in: US.
Gebre-Egziabher, "GNSS Solutions: Weighting GNSS Observations and Variations of GNSS/INS Integration", "www.insidegnss.com", Jan. 1, 2007, pp. 26-33, Publisher: InsideGNSS.
Hegrenas at al., "Underwater Transponder Positioning and Navigation of Autonomous Underwater Vehicles", "Marine Technology for Our Future: Global and Local Challenges", Oct. 26, 2009, pp. 1-7, Publisher: IEEE, Published in: US.
Jalving et al., "A Toolbox of Aiding Techniques for the Hugin AUV Integrated Inertail Navigation System", "Celebrating the Past, Teaming Toward the Future", Sep. 22, 2003, pp. 1146-1153, Publisher: IEEE, Published in: US.
Maybeck, "Stochastic Estimation and Control", "Design and Performance Analysis of Kalman Filters", 2004, pp. 296, vol. 1, Publisher: Navtech Book and Software Store, Published in: US.
Stengel, "Optimal Control and Estimation", "Discrete-Time Optimal Filters and Predictors", 1994, pp. 344-347, Publisher: Dover Books, Published in: US.

\* cited by examiner

SMOOTHED NAVIGATION SOLUTION USING FILTERED RESETS

BACKGROUND

Exemplary navigation systems provide navigation solutions including position, velocity, and/or attitude data of objects, including aircraft and other vehicles. Some navigation solutions are based on data from inertial sensors, such as accelerometers measuring linear velocity and gyroscopes measuring angular rates. Accelerometers and gyroscopes inherently have errors. These errors build up over time. In order to correct for errors in a navigation solution caused by errors in the accelerometer and/or gyroscope data, aiding sources (aiding devices) can be used. One aiding source that is currently used is a GNSS receiver. When a GNSS receiver is used as an aiding source, navigation systems can blend data received from the GNSS receiver with the navigation solution using a Kalman filter. This GNSS solution has fairly accurate data over a long period, but it is also fairly noisy. Blending together our inertial navigation solution with the GNSS data works well at removing inertial errors.

Exemplary navigation systems also often include feedback of the navigation solution back to the GNSS receiver to aid in tracking. When these navigation systems already have a navigation solution and then subsequently receive a GNSS signal once the GNSS signal is acquired, these navigation systems could have significant error in the navigation solution. When these navigation systems receive initial data from the GNSS receiver, these navigation systems will reset their navigation solution based on the received data fairly quickly. The GNSS signal may not acquire signals until the vehicle is moving and sometimes not even until in the air with the case of aircraft. The GNSS receiver will acquire signals and will start providing data to use in the Kalman filter. Once the initial data is provided by the GNSS receiver for use in the Kalman filter, the navigation solution is reset. The navigation solution is fed back to the GNSS receiver and the GNSS receiver could see a significant reset in its velocities, positions, etc. Because of the high bandwidth of GNSS receivers (and other aiding devices), the loops inside the GNSS receiver could lose track due these step changes in the navigation solution. If the loops within the GNSS receiver lose track, the GNSS data is no longer good and the data would be rejected. In exemplary embodiments, the satellite signal tracking loops inside the GNSS receiver could lose lock with jumps in position that are greater than about 30 meters and/or step changes in velocity that are greater than about 5-10 meters per second. In other embodiments, the loops inside the aiding device could lose lock with greater or smaller changes based on different sensitivities to step changes in the information fed back to the aiding device.

SUMMARY

A navigation system includes at least one inertial sensor configured to detect motion of the system and generate inertial data; at least one aiding device configured to generate aiding device measurement data; at least one processing unit configured to generate an un-smoothed navigation solution inclusive of navigation state variable error resets based on the inertial data and the aiding device measurement data; wherein the at least one processing unit is further configured to sum the state variable error resets into a cumulative sum of the state variable error resets; wherein the at least one processing unit is further configured to high pass filter the cumulative sum of the state variable error resets; and wherein the at least one processing unit is further configured to subtract the high pass filtered cumulative sum of the state variable error resets from the un-smoothed navigation solution to generate a smoothed navigation solution.

DRAWINGS

Understanding that the drawings depict only exemplary embodiments and are not therefore to be considered limiting in scope, the exemplary embodiments will be described with additional specificity and detail through the use of the accompanying drawings in which.

Figure 1A:
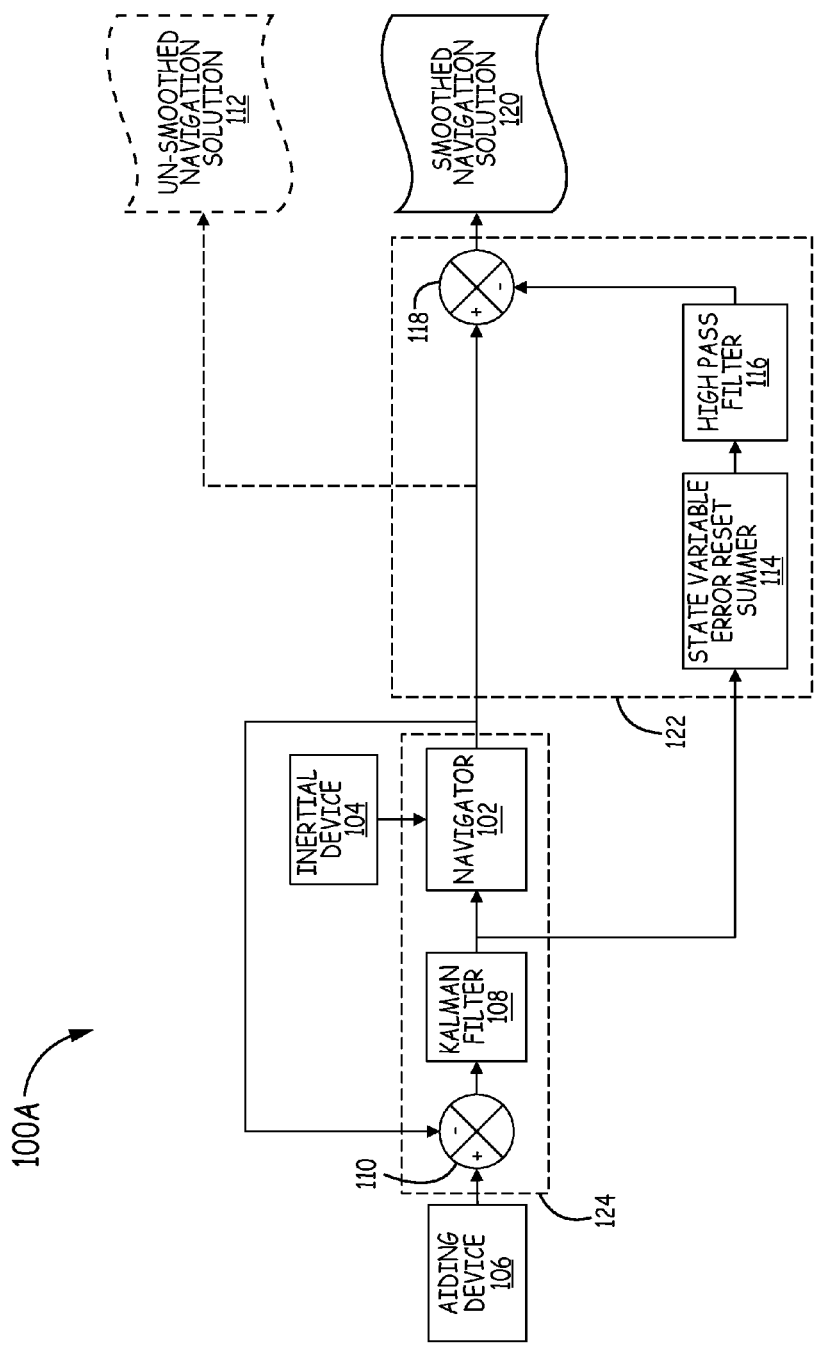
FIGS. 1A-1C are block diagrams depicting exemplary embodiments of navigation systems according to the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Figure 1B:
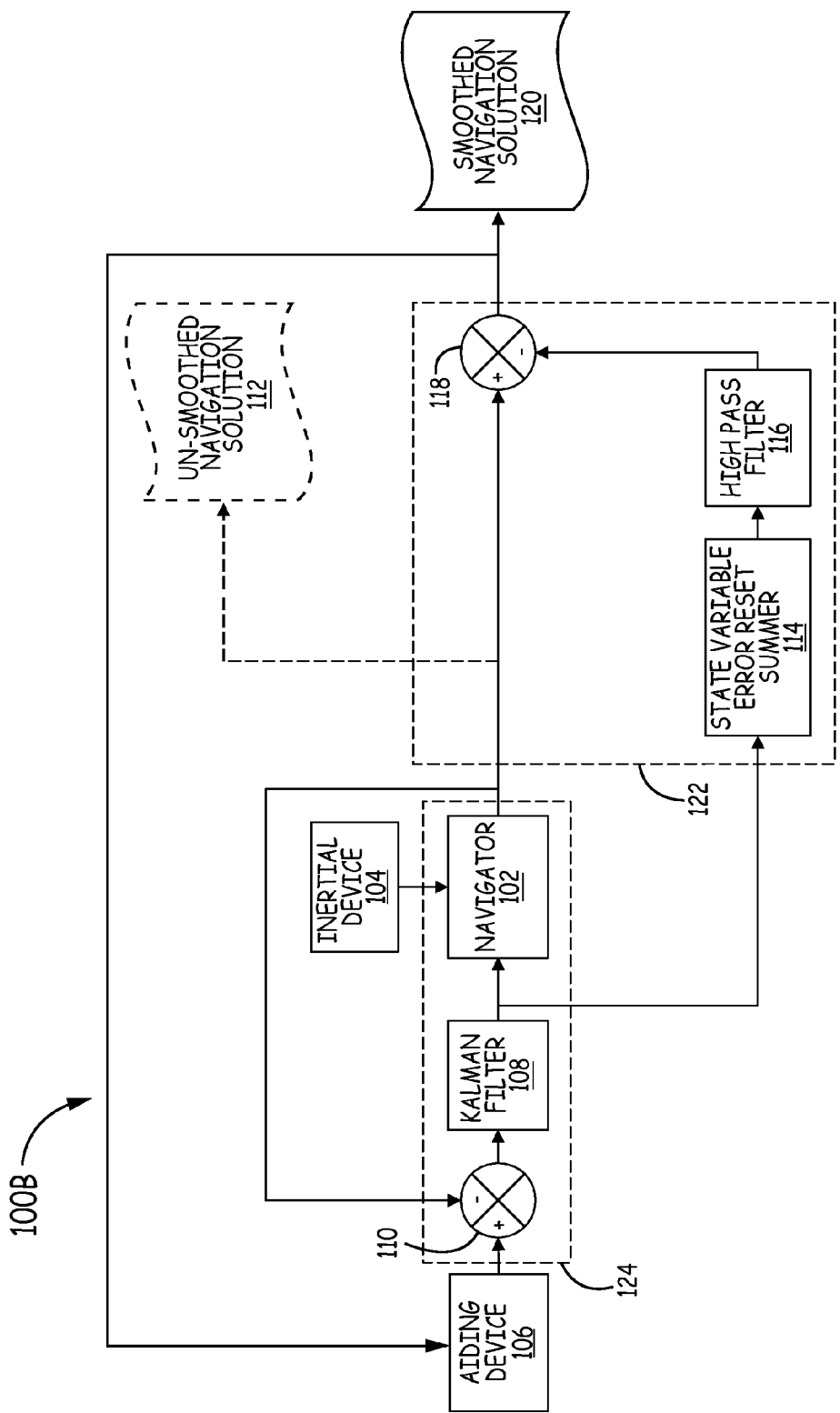
Figure 1C:
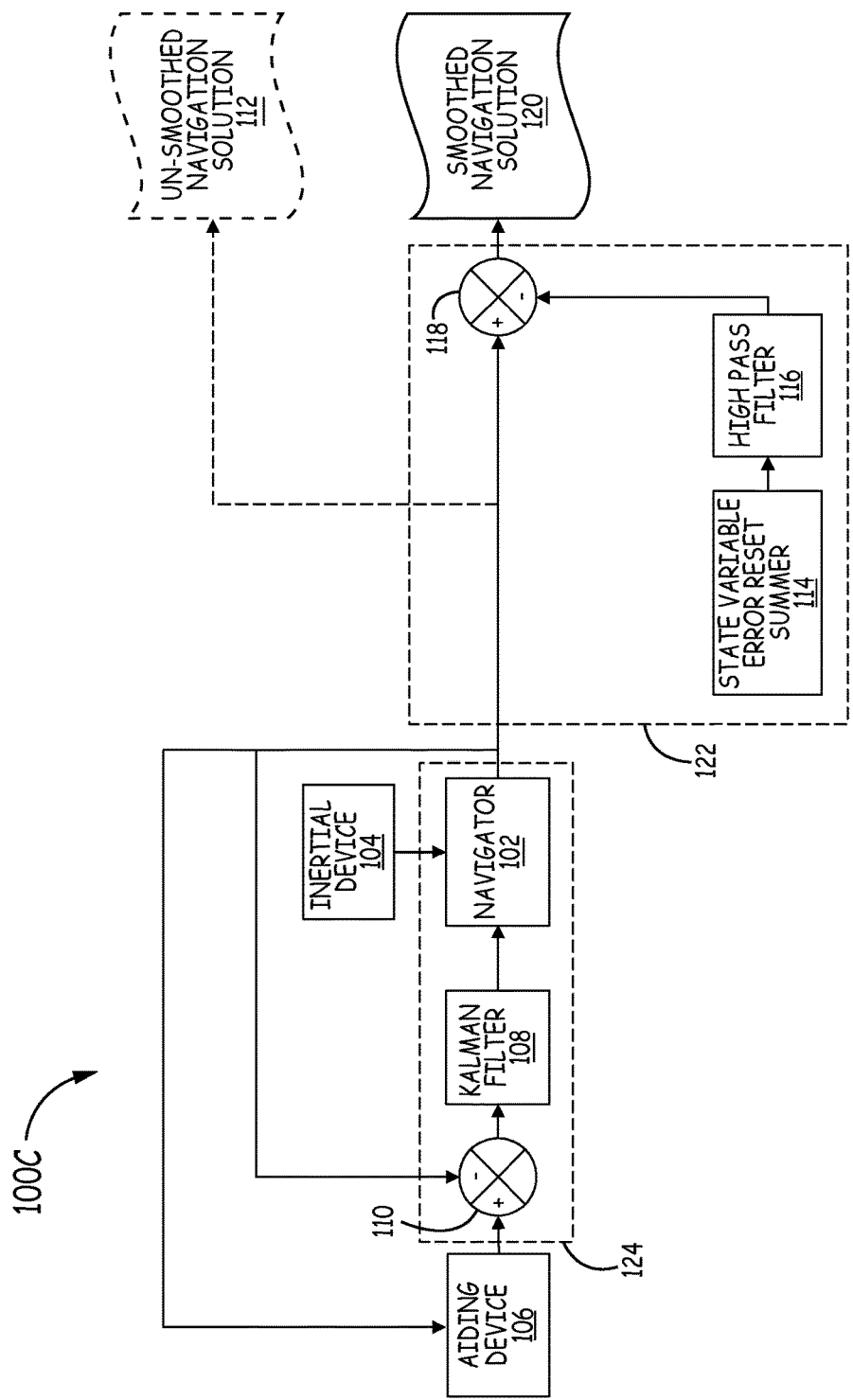

FIGS. 1A-1C are block diagrams depicting exemplary embodiments of navigation systems 100. While any of navigation systems 100 may be implemented on aircraft (including jets, planes, helicopters, blimps, and balloons), they can also be implemented onboard other vehicles, such as space vehicles, sea vessels (including ships and submersibles), and ground vehicles; missiles, rockets, and other ballistics and projectiles; integrated into systems worn by individuals on ground, in structures or caverns, in air, on or in water, or in space; integrated into buildings, other structures, and/or caverns; or integrated in other ways and for other uses. Each of FIGS. 1A-1C illustrates a different embodiment of navigation system 100, labeled 100A-100C respectively.

FIG. 1A is a block diagram depicting an exemplary embodiment of a navigation system 100A. Navigation system 100A includes a navigator 102, at least one inertial device 104 (any number of inertial devices can be used), at least one aiding device 106 (any number of aiding devices can be used, including aiding devices of different types), a Kalman filter 108, a summer 110, optional output of an un-smoothed navigation solution 112, a state variable error reset summer 114, a high pass filter 116, a summer 118, and output of a smoothed navigation solution 120. The state variable error reset summer 114, high pass filter 116, and summer 118 can be integrated as components of an optional navigation solution smoothing function 122. Similarly, the navigator 102, Kalman filter 108, and summer 110 can be integrated as components of an optional navigation solution generation function 124.

In exemplary embodiments, the aiding device 106 is configured to receive signals regarding at least one of the position (sometimes referred to as location), velocity, orientation (including attitude data comprising at least one of roll, pitch, and heading), etc. of the system and is configured to generate aiding device measurement data pertaining to the navigation system 100A. In exemplary embodiments, the aiding device 106 includes at least one of a global navigation satellite system (GNSS) receiver, a magnetometer, a pressure sensor, a master inertial navigation system, a Doppler radar receiver, LOng RAnge Navigation (LORAN) based positioning receiver, etc. Aiding device 106 supplies the aiding device measurement data to the summer 110. Summer 110 is configured to receive aiding device measurement data (such as position, velocity, attitude, or orientation) from the aiding device 106 and is also configured to receive a previous un-smoothed navigation solution 112 from the navigator 102. In exemplary embodiments, the aiding device measurement data includes position measurements from a GNSS receiver or LORAN receiver, velocity measurements from a Doppler radar, orientation (or heading) measurements from a compass or magnetometer, etc. Summer 110 is configured to subtract the previous un-smoothed navigation solution 112 from the aiding device measurement data to determine error measurements between the aiding device measurement data supplied by the aiding device 106 and the previously calculated un-smoothed navigation solution 112. In exemplary embodiments, the error measurements include errors between position measurements of the aiding device measurement data and position solutions of the previously calculated un-smoothed navigation solution 112, errors between velocity measurements of the aiding device measurement data and velocity solutions of the previously calculated un-smoothed navigation solution 112, and/or errors between orientation measurements of the aiding device measurement data and orientation solutions of the previously calculated un-smoothed navigation solution.

In exemplary embodiments, the Kalman filter 108 is configured to receive the error measurements from the summer 110 and is configured to generate state variable error resets based on the error measurements between the aiding device measurement data supplied by the aiding device 106 and the previously calculated un-smoothed navigation solution 112. In exemplary embodiments, the state variable error resets include at least one of a velocity error reset, an altitude error reset, a latitude and longitude error reset, and an attitude error reset. In exemplary embodiments, the state variable error resets are most significant when the aiding device 106 first starts producing some aiding device measurement data, such as when a GNSS receiver aiding device first acquires (or re-acquires) by locking onto enough satellites to produce position data. At times, this may occur only soon after starting up the aiding device 106 or if there is a power cycle during operation. In other embodiments, the state variable error resets are only generated when the aiding device 106 first starts producing some data, such as when a GNSS receiver aiding device acquires (or re-acquires) by locking onto enough satellites to produce position data.

The inertial device 104 is configured to detect motion of the navigation system 100A and to generate inertial data regarding the motion of the navigation system 100A. In exemplary embodiments, the inertial device 104 includes any combination of gyroscopes and accelerometers to detect linear and/or rotational motion. In exemplary embodiments, the inertial device 104 is an inertial measurement unit (IMU) or other combination of inertial sensors or an individual inertial sensor. The navigator 102 is configured to receive inertial data from the inertial device 104 and the state variable error resets from the Kalman filter 108. The navigator 102 is configured to calculate the un-smoothed navigation solution 112 based on the inertial data received form the inertial device 104 and the state variable error resets received from the Kalman filter 108, the un-smoothed navigation solution inclusive of the navigation state error resets.

In exemplary embodiments, the state variable error reset summer 114 is configured to receive state variable error resets and to sum the state variable error resets into a cumulative sum of state variable error resets. In exemplary embodiments, the state variable error reset summer 114 is configured to receive state variable error resets from the Kalman filter 108 as shown in FIG. 1A. In other embodiments, these state variable resets are received from the navigator 102. In exemplary embodiments, the state variable error resets include at least one of a velocity error reset, an altitude error reset, a latitude and longitude error reset, and an attitude error reset. In exemplary embodiments, the different types of state variable error resets are summed independent of each other to create various cumulative sums of state variable error resets. In exemplary embodiments, the state variable error reset summer 114 includes at least one of a velocity error reset summer, an attitude error reset summer, a latitude and longitude error reset summer, and an altitude error reset summer. In exemplary embodiments, the state variable error reset summer 114 and/or any of the individual velocity error reset summer, altitude error reset summer, latitude and longitude error reset summer, and attitude error reset summer generate at least one of a cumulative sum of velocity error resets, a cumulative sum of altitude error resets, a cumulative sum of latitude and longitude error resets, and a cumulative sum of attitude error resets.

In exemplary embodiments, the high pass filter 116 is configured to receive the cumulative sum of state variable error resets from the state variable error reset summer 114 and high pass filters them. In exemplary embodiments, the high pass filter 116 filters out the low frequency data that is changing slowly (and is not likely to be part of a step change in the un-smoothed navigation solution 112), leaving the information that is changing rapidly (that is likely to be a part of one or more step changes to the un-smoothed navigation solution 112). Thus, the high pass filter 116 allows the state variable error resets that are changing fairly rapidly to pass through and filters out the state variable error resets that are not changing rapidly. In exemplary embodiments, the high pass filter includes various sub-filters to high pass filter any individual types of cumulative state variable error resets, including a cumulative sum of velocity error resets, a cumulative sum of altitude error resets, a cumulative sum of latitude and longitude error resets, and a cumulative sum of attitude error resets.

In exemplary embodiments, the summer 118 is configured to subtract the high pass filtered cumulative sum of the variable error resets from the un-smoothed navigation solution 112 to generate the smoothed navigation solution 120. The previous high pass filtering of the cumulative sum of the variable error resets isolated the effects of the error resets that should be removed from the un-smoothed navigation solution 112 to mitigate the step change that is present in the un-smoothed navigation solution 112. Thus, the smoothed navigation solution 120 will not include the fast changing data caused by the resets that is present in the un-smoothed navigation solution 112 any thusly will not have large step changes. Still, even with filtering of these resets, the smoothed navigation solution 120 (that responds more gradually to the state variable error resets) will eventually converge with the un-smoothed navigation solution 112 (that responds more quickly to the state variable error resets).

In exemplary embodiments, the summer 118 includes a plurality of components that subtract the different components of variable error resets from the corresponding components of the un-smoothed navigation solution 112. For example, in some embodiments, various components of the summer 118 subtract the different components of variable error resets from the corresponding components of the un-smoothed navigation solution 112 to generate various components of the smoothed navigation solution 120, including subtracting at least one of the cumulative sum of velocity error resets from the velocity component of the un-smoothed navigation solution 112 to generate the velocity component of the smoothed navigation solution 120, the cumulative sum of altitude error resets from the altitude component of the un-smoothed navigation solution 112 to generate the altitude component of the smoothed navigation solution 120, the cumulative sum of latitude and longitude error resets from the latitude and longitude component of the un-smoothed navigation solution 112 to generate the latitude and longitude component of the smoothed navigation solution 120, and the cumulative sum of attitude error resets from the attitude component of the un-smoothed navigation solution 112 to generate the attitude component of the smoothed navigation solution 120.

Un-smoothed navigation solution 112 and smoothed navigation solution 120 generated by the navigation system 100A may include any type of navigation solution, including a velocity solution, an altitude solution, a latitude and longitude solution, and an attitude solution and any combinations or derivatives thereof. In exemplary embodiments, the un-smoothed navigation solution 112 and the smoothed navigation solution 120 include a single type of navigation solution. In other exemplary embodiments, the un-smoothed navigation solution 112 and the smoothed navigation solution 120 include a plurality of types of navigation solutions.

The navigation system 100A described above has the advantages of being able to provide the smoothed navigation solution 120 while minimizing the phase delay introduced by the filtering. This is enabled by the filtering out the high frequency state variable error resets from the un-smoothed navigation solution 112 without filtering the entire un-smoothed navigation solution 112. Accordingly, only the abrupt step changes and/or resets in the Kalman filtered solution are filtered out in the smoothed navigation solution 120, while there are other dynamics of the movement of the navigation system 100A that will not be delayed or have a phase delay associated with them. This enables the smoothed navigation solution 120 generated by the navigation system 100A to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed navigation solution 120 is used with a vehicle's autopilot system to smooth out the autopilot's response to changes in the navigation solution. This enables the autopilot to accurately respond to changes and/or corrections in the navigation solution data without commanding a vehicle to perform an abrupt maneuver. In exemplary embodiments, the smoothed navigation solution 120 is used to control where a seeker is pointed or to help steer a GNSS receiver to better track GNSS signals. In exemplary embodiments, the speed at which the smoothed navigation solution 120 converges to the un-smoothed navigation solution can be adjusted by a user.

FIG. 1B is a block diagram depicting an exemplary embodiment of a navigation system 100B. Navigation system 100B includes navigator 102, inertial device 104, aiding device 106, Kalman filter 108, summer 110, optional output of the un-smoothed navigation solution 112, state variable error reset summer 114, high pass filter 116, summer 118, and output of the smoothed navigation solution 120. The state variable error reset summer 114, high pass filter 116, and summer 118 can be integrated as components of the optional navigation solution smoothing function 122. Similarly, the navigator 102, Kalman filter 108, and summer 110 can be integrated as components of the optional navigation solution generation function 124. Navigation system 100B includes similar components to navigation system 100A and operates according to similar principles and methods as navigation system 100A described above. The difference between navigation system 100B and navigation system 100A is that navigation system 100B includes feedback of the smoothed navigation solution 120 to the aiding device 106.

In exemplary embodiments, the aiding device 106 is configured to receive the smoothed navigation solution 120 and to use the smoothed navigation solution 120 to aid in generating aiding device measurement data based on the position of the system. In exemplary embodiments, use of the smoothed navigation solution 120 by the aiding device 106 minimizes the chance that the aiding device 106 will lose lock within its loops based on a step change that may be present in the un-smoothed navigation solution 112.

FIG. 1C is a block diagram depicting an exemplary embodiment of a navigation system 100C. Navigation system 100C includes navigator 102, inertial device 104, aiding device 106, Kalman filter 108, summer 110, optional output of the un-smoothed navigation solution 112, state variable error reset summer 114, high pass filter 116, summer 118, and output of the smoothed navigation solution 120. The state variable error reset summer 114, high pass filter 116, and summer 118 can be integrated as components of the optional navigation solution smoothing function 122. Similarly, the navigator 102, Kalman filter 108, and summer 110 can be integrated as components of the optional navigation solution generation function 124. Navigation system 100C includes similar components to navigation system 100A and operates according to similar principles and methods as navigation system 100A described above. The difference between navigation system 100C and navigation system 100A is that navigation system 100C includes feedback of the un-smoothed navigation solution 112 to the aiding device 106.

In exemplary embodiments, the aiding device 106 is configured to receive the un-smoothed navigation solution 112 and to use the un-smoothed navigation solution 112 to aid in generating aiding device measurement data based on the position of the system. In exemplary embodiments, use of the un-smoothed navigation solution 112 instead of the smoothed navigation solution 120 by the aiding device 106 will not as effectively minimize the chance that the aiding device 106 will lose lock within its loops based on a step change present in the un-smoothed navigation solution 112.

FIGS. 2A-2E are block diagrams depicting exemplary embodiments of optional navigation solution smoothing function 122 of any of navigation systems 100A-100C. Each of FIGS. 2A-2E illustrates a different embodiment of navigation solution smoothing function 122, labeled 122A-122E respectively.

Figure 2A:
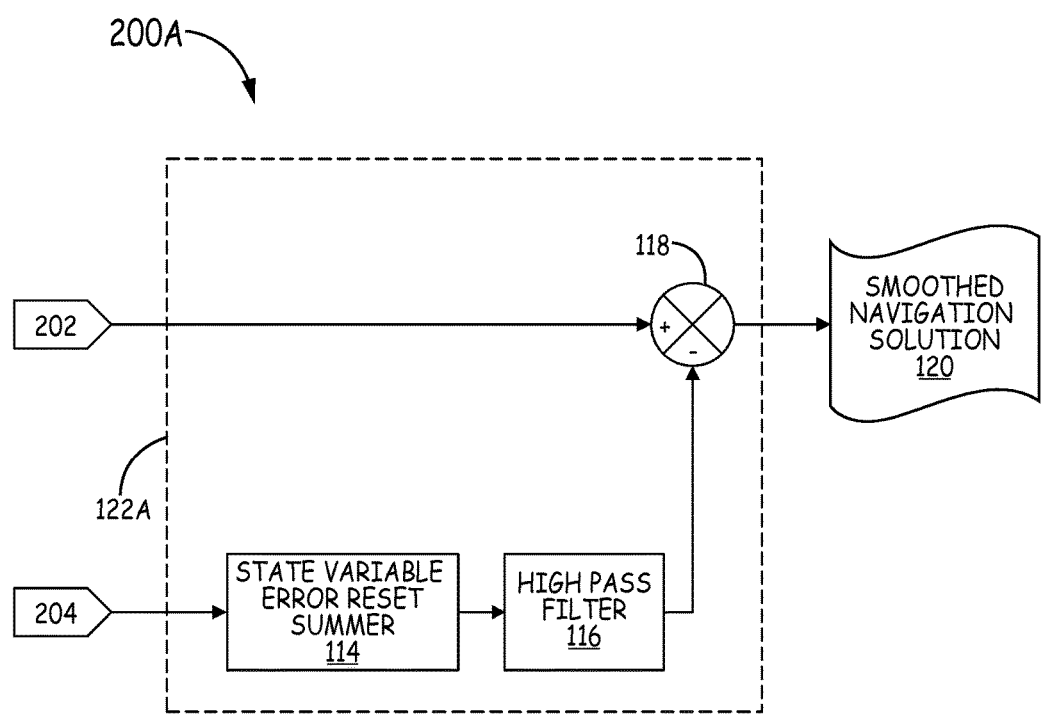
FIGS. 2A-2E are block diagrams depicting exemplary embodiments of navigation solution smoothing functions of the navigation systems shown in FIGS. 1A-1C.

FIG. 2A is a block diagram depicting an exemplary embodiment of a navigation solution smoothing function 122A. Navigation solution smoothing function 122A is configured to receive an un-smoothed navigation solution 112 as a first input 202 and state variable error resets as a second input 204 and is configured to generate a smoothed navigation solution 120. Specifically, navigation solution smoothing function 122A includes state variable error reset summer 114, high pass filter 116, summer 118, and output of the smoothed navigation solution 120. State variable error reset summer 114 is configured to receive state variable error resets from the second input 204 and to sum the state variable error resets into a cumulative sum of state variable error resets. In exemplary embodiments, the state variable error reset summer 114 is configured to receive state variable error resets as second input 204 from a Kalman filter, such as Kalman filter 108 shown in FIG. 1A. In other embodiments, the state variable error reset summer 114 is configured to receive variable error resets from another source.

In exemplary embodiments, the state variable error resets include at least one of a velocity error reset, an altitude error reset, a latitude and longitude error reset, and an attitude error reset. In exemplary embodiments, the different types of state variable error resets are summed independent of each other to create various cumulative sums of state variable error resets. In exemplary embodiments, the state variable error reset summer 114 includes at least one of a velocity error reset summer, an altitude error reset summer, a latitude and longitude error reset summer, and an attitude error reset summer (such as those summers described below with reference to FIGS. 2B-2E). In exemplary embodiments, the state variable error reset summer 114 and/or any of the individual velocity error reset summer, altitude error reset summer, latitude and longitude error reset summer, and attitude error reset summer generate at least one of a cumulative sum of velocity error resets, a cumulative sum of altitude error resets, a cumulative sum of latitude and longitude error resets, and a cumulative sum of attitude error resets.

In exemplary embodiments, the high pass filter 116 is configured to receive the cumulative sum of state variable error resets from the state variable error reset summer 114 and high pass filters them. In exemplary embodiments, the high pass filter 116 filters out the low frequency data that is changing slowly (and is not likely to be part of a step change in the un-smoothed navigation solution 112), leaving the information that is changing rapidly (that is likely to be a part of one or more step changes to the un-smoothed navigation solution 112). Thus, the high pass filter 116 allows the state variable error resets that are changing fairly rapidly to pass through and filters out the state variable error resets that are not changing rapidly. In exemplary embodiments, the high pass filter includes various sub-filters to high pass filter any individual types of cumulative state variable error resets, including a cumulative sum of velocity error resets, a cumulative sum of altitude error resets, a cumulative sum of latitude and longitude error resets, and a cumulative sum of attitude error resets (such as those sub-filters described below with reference to FIGS. 2B-2E).

In exemplary embodiments, the summer 118 is configured to subtract the high pass filtered cumulative sum of the variable error resets from the un-smoothed navigation solution 112 to generate the smoothed navigation solution 120.

The previous high pass filtering of the cumulative sum of the variable error resets isolated the effects of the error resets that should be removed from the smoothed navigation solution 120 to mitigate the step change that is present in the un-smoothed navigation solution 112. In exemplary embodiments, the summer 118 includes a plurality of components that subtract the different components of variable error resets from the corresponding components of the un-smoothed navigation solution 112. For example, in some embodiments, various components of the summer 118 subtract the different components of variable error resets from the corresponding components of the un-smoothed navigation solution 112 to generate various components of the smoothed navigation solution 120, including subtracting at least one of the cumulative sum of velocity error resets from the velocity component of the un-smoothed navigation solution 112 to generate the velocity component of the smoothed navigation solution 120, the cumulative sum of altitude error resets from the altitude component of the un-smoothed navigation solution 112 to generate the altitude component of the smoothed navigation solution 120, the cumulative sum of latitude and longitude error resets from the latitude and longitude component of the un-smoothed navigation solution 112 to generate the latitude and longitude component of the smoothed navigation solution 120, and the cumulative sum of attitude error resets from the attitude component of the un-smoothed navigation solution 112 to generate the velocity component of the smoothed navigation solution 120.

Un-smoothed navigation solution 112 and smoothed navigation solution 120 generated by the navigation solution smoothing function 122A may include any type of navigation solution, including a velocity solution, an altitude solution, a latitude and longitude solution, and an attitude solution and any combinations or derivatives thereof (such as the solutions described below with reference to FIGS. 2B-2E). In exemplary embodiments, the smoothed navigation solution 120 includes a single type of navigation solution (such as one of the types of solutions described below with reference to FIGS. 2B-2E). In other exemplary embodiments, the smoothed navigation solution 120 include a plurality of types of navigation solutions (such as any of the types of solutions described below with reference to FIGS. 2B-2E).

The navigation solution smoothing function 122A described above has the advantages of being able to provide the smoothed navigation solution 120 while minimizing the phase delay introduced by the filtering. This is enabled by the filtering out the high frequency state variable error resets from the un-smoothed navigation solution 112 without filtering the entire un-smoothed navigation solution 112. Accordingly, only the abrupt step changes and/or resets in the Kalman filtered solution are filtered out in the smoothed navigation solution 120, while there are other dynamics of the movement of the navigation solution smoothing function 122A that will not be delayed or have a phase delay associated with them. This enables the smoothed navigation solution 120 generated by the navigation solution smoothing function 122A to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed navigation solution 120 is used with a vehicle's autopilot system to smooth out the autopilot's response to changes in the navigation solution. This enables the autopilot to accurately respond to changes and/or corrections in the navigation solution data without commanding a vehicle to perform an abrupt maneuver. In exemplary embodiments, the smoothed navigation solution 120 is used to control where a seeker is pointed or to help steer a GNSS receiver to better track GNSS signals. In exemplary embodiments, the speed at which the smoothed navigation solution 120 converges to the un-smoothed navigation solution can be adjusted by a user.

Figure 2B:
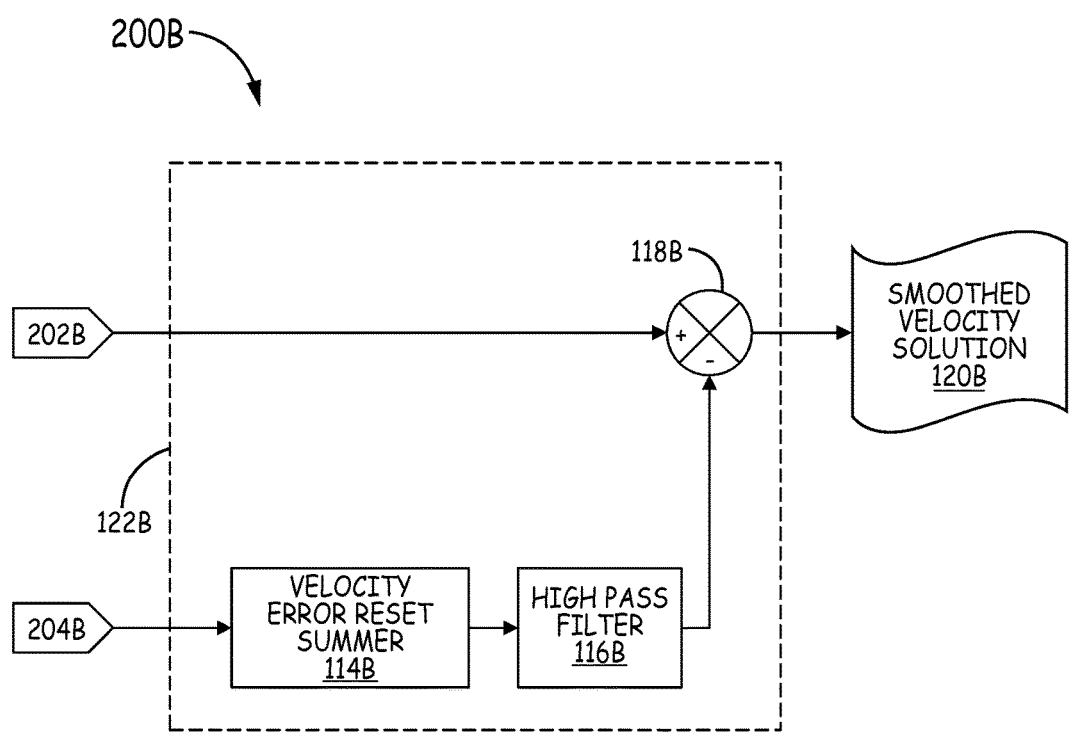

FIG. 2B is a block diagram depicting an exemplary embodiment of a velocity solution smoothing function 122B focused on generating a smoothed velocity solution 120B. Velocity solution smoothing function 122B is configured to receive an un-smoothed velocity solution as a first input 202B and velocity error resets as a second input 204B and is configured to generate the smoothed velocity solution 120B. The unsmoothed velocity solution may be included in the un-smoothed navigation solution 112 described above. Similarly, the velocity error resets may be included in state variable error resets received from a Kalman filter or another source as described above. Velocity solution smoothing function 122B includes velocity error reset summer 114B, high pass filter 116B, summer 118B, and output of the smoothed velocity solution 120B. Velocity error reset summer 114B is configured to receive velocity error resets from second input 204B and to sum the velocity error resets into a cumulative sum of velocity error resets.

In exemplary embodiments, the high pass filter 116B is configured to receive the cumulative sum of velocity error resets from the velocity error reset summer 114B and high pass filters it. In exemplary embodiments, the high pass filter 116B filters out the low frequency data from the cumulative sum of velocity error resets that is changing slowly (and is not likely to be part of a step change in the un-smoothed velocity solution 112B), leaving the information that is changing rapidly (that is likely to be a part of one or more step changes to the un-smoothed velocity solution 112B). In exemplary embodiments, the summer 118B is configured to subtract the high pass filtered cumulative sum of the velocity error resets from the un-smoothed velocity solution received from first input 202B to generate the smoothed velocity solution 120B. The previous high pass filtering of the cumulative sum of the velocity error resets isolated the effects of the velocity error resets that should be removed from the smoothed velocity solution 120B to mitigate the step change in velocity that is present in the un-smoothed velocity solution.

The velocity solution smoothing function 122B described above has the advantages of being able to provide the smoothed velocity solution 120B while minimizing the phase delay introduced by the filtering. This is enabled by the filtering out the high frequency velocity error resets from the un-smoothed velocity solution 112B without filtering the entire un-smoothed velocity solution 112B. Accordingly, only the abrupt step changes and/or resets in the Kalman filtered solution are filtered out in the smoothed velocity solution 120B, while there are other dynamics of the velocity of the navigation system that will not be delayed or have a phase delay associated with them. This enables the smoothed velocity solution 120B generated by the velocity solution smoothing function 122B to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed velocity solution 120B is used with a vehicle's autopilot system to smooth out the autopilot's response to changes in the navigation solution. This enables the autopilot to accurately respond to changes and/or corrections in the velocity solution data without commanding a vehicle to perform an abrupt maneuver. In exemplary embodiments, the smoothed velocity solution 120B is used to control where a seeker is pointed or to help steer a GNSS receiver to better track GNSS signals. In exemplary embodiments, the speed at which the smoothed velocity solution 120B converges to the un-smoothed velocity solution 112B can be adjusted by a user.

Figure 2C:
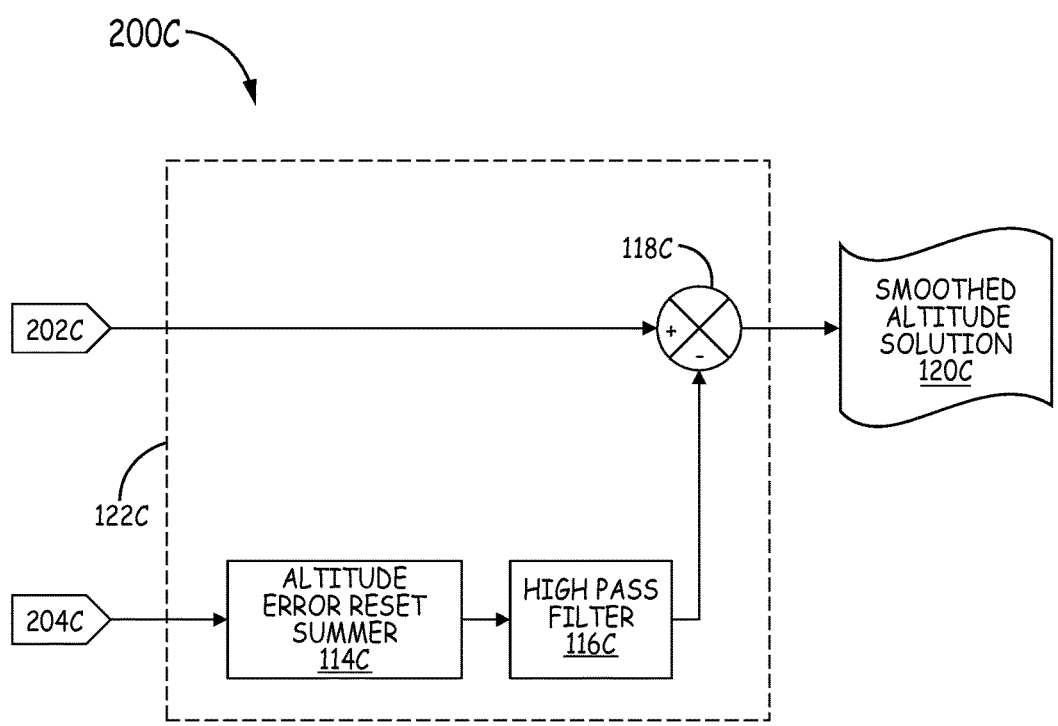

FIG. 2C is a block diagram depicting an exemplary embodiment of an altitude solution smoothing function 122C focused on generating a smoothed altitude solution 120C. Altitude solution smoothing function 122C is configured to receive an un-smoothed altitude solution as a first input 202C and altitude error resets as a second input 204C and is configured to generate the smoothed altitude solution 120C. The unsmoothed altitude solution may be included in the un-smoothed navigation solution 112 described above. Similarly, the altitude error resets may be included in state variable error resets received from a Kalman filter or another source as described above. Altitude solution smoothing function 122C includes altitude error reset summer 114C, high pass filter 116C, summer 118C, and output of the smoothed altitude solution 120C. Altitude error reset summer 114C is configured to receive altitude error resets from second input 204C and to sum the altitude error resets into a cumulative sum of altitude error resets.

In exemplary embodiments, the high pass filter 116C is configured to receive the cumulative sum of altitude error resets from the altitude error reset summer 114C and high pass filters it. In exemplary embodiments, the high pass filter 116C filters out the low frequency data from the cumulative sum of altitude error resets that is changing slowly (and is not likely to be part of a step change in the un-smoothed altitude solution 112C), leaving the information that is changing rapidly (that is likely to be a part of one or more step changes to the un-smoothed altitude solution 112C). In exemplary embodiments, the summer 118C is configured to subtract the high pass filtered cumulative sum of the altitude error resets from the un-smoothed altitude solution received from first input 202C to generate the smoothed altitude solution 120C. The previous high pass filtering of the cumulative sum of the altitude error resets isolated the effects of the altitude error resets that should be removed from the smoothed altitude solution 120C to mitigate the step change in altitude that is present in the un-smoothed altitude solution.

The altitude solution smoothing function 122C described above has the advantages of being able to provide the smoothed altitude solution 120C while minimizing the phase delay introduced by the filtering. This is enabled by the filtering out the high frequency altitude error resets from the un-smoothed altitude solution 112C without filtering the entire un-smoothed altitude solution 112C. Accordingly, only the abrupt step changes and/or resets in the Kalman filtered solution are filtered out in the smoothed altitude solution 120C, while there are other dynamics of the altitude of the navigation system that will not be delayed or have a phase delay associated with them. This enables the smoothed altitude solution 120C generated by the altitude solution smoothing function 122C to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed altitude solution 120C is used with a vehicle's autopilot system to smooth out the autopilot's response to changes in the navigation solution. This enables the autopilot to accurately respond to changes and/or corrections in the altitude solution data without commanding a vehicle to perform an abrupt maneuver. In exemplary embodiments, the smoothed altitude solution 120C is used to control where a seeker is pointed or to help steer a GNSS receiver to better track GNSS signals. In exemplary embodiments, the speed at which the smoothed altitude solution 120C converges to the un-smoothed altitude solution 112C can be adjusted by a user.

Figure 2D:
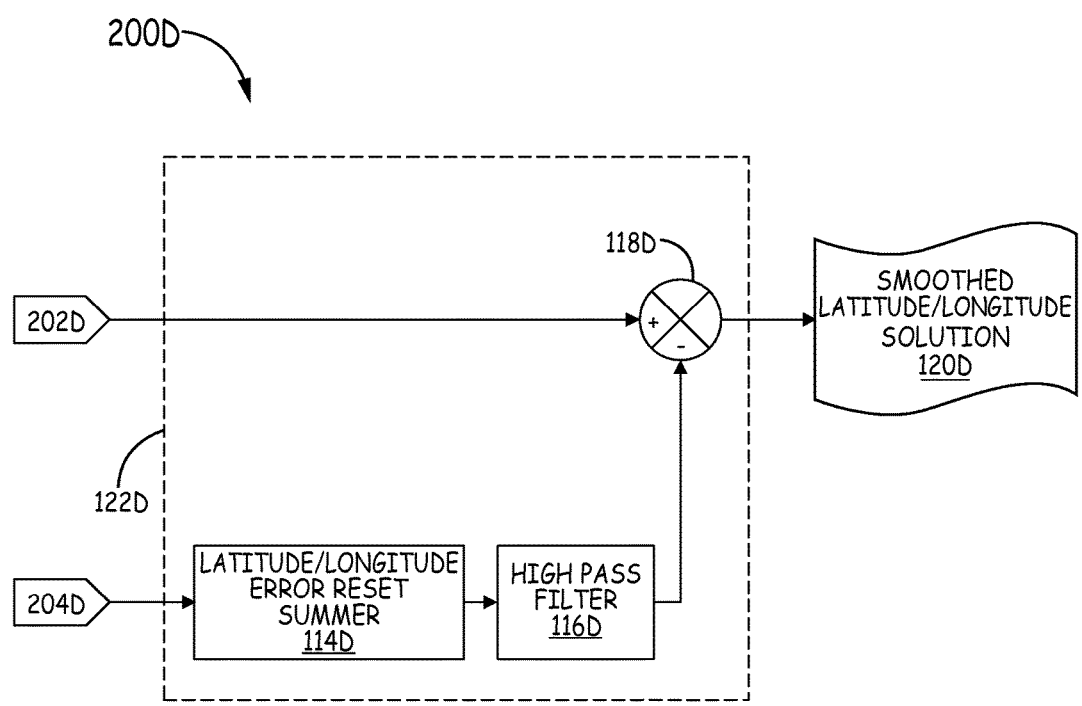

FIG. 2D is a block diagram depicting an exemplary embodiment of a latitude/longitude solution smoothing function 122D focused on generating a smoothed latitude/longitude solution 120D. Latitude/longitude solution smoothing function 122D is configured to receive an un-smoothed latitude/longitude solution as a first input 202D and latitude/longitude error resets as a second input 204D and is configured to generate the smoothed latitude/longitude solution 120D. The unsmoothed latitude/longitude solution may be included in the un-smoothed navigation solution 112 described above. Similarly, the latitude/longitude error resets may be included in state variable error resets received from a Kalman filter or another source as described above. Latitude/longitude solution smoothing function 122D includes latitude/longitude error reset summer 114D, high pass filter 116D, summer 118D, and output of the smoothed latitude/longitude solution 120D. Latitude/longitude error reset summer 114D is configured to receive latitude/longitude error resets from second input 204D and to sum the latitude/longitude error resets into a cumulative sum of latitude/longitude error resets.

In exemplary embodiments, the high pass filter 116D is configured to receive the cumulative sum of latitude/longitude error resets from the latitude/longitude error reset summer 114D and high pass filters it. In exemplary embodiments, the high pass filter 116D filters out the low frequency data from the cumulative sum of latitude/longitude error resets that is changing slowly (and is not likely to be part of a step change in the un-smoothed latitude/longitude solution 112D), leaving the information that is changing rapidly (that is likely to be a part of one or more step changes to the un-smoothed latitude/longitude solution 112D). In exemplary embodiments, the high pass filter 116D filters out the more steady state values of the cumulative sum of latitude/longitude error resets to leave the information that is changing quickly. In exemplary embodiments, the summer 118D is configured to subtract the high pass filtered cumulative sum of the latitude/longitude error resets from the un-smoothed latitude/longitude solution received from first input 202D to generate the smoothed latitude/longitude solution 120D. The previous high pass filtering of the cumulative sum of the latitude/longitude error resets isolated the effects of the latitude/longitude error resets that should be removed from the smoothed latitude/longitude solution 120D to mitigate the step change in latitude/longitude that is present in the un-smoothed latitude/longitude solution.

The latitude/longitude solution smoothing function 122D described above has the advantages of being able to provide the smoothed latitude/longitude solution 120D while minimizing the phase delay introduced by the filtering. This is enabled by the filtering out the high frequency latitude/longitude error resets from the un-smoothed latitude/longitude solution 112D without filtering the entire un-smoothed latitude/longitude solution 112D. Accordingly, only the abrupt step changes and/or resets in the Kalman filtered solution are filtered out in the smoothed latitude/longitude solution 120D, while there are other dynamics of the latitude/longitude of the navigation system that will not be delayed or have a phase delay associated with them. This enables the smoothed latitude/longitude solution 120D generated by the latitude/longitude solution smoothing function 122D to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed latitude/longitude solution 120D is used with a vehicle's autopilot system to smooth out the autopilot's response to changes in the navigation solution. This enables the autopilot to accurately respond to changes and/or corrections in the latitude/longitude solution data without commanding a vehicle to perform an abrupt maneuver. In exemplary embodiments, the smoothed latitude/longitude solution 120D is used to control where a seeker is pointed or to help steer a GNSS receiver to better track GNSS signals. In exemplary embodiments, the speed at which the smoothed latitude/longitude solution 120D converges to the un-smoothed latitude/longitude solution 112D can be adjusted by a user. While the latitude/longitude solutions are described as being smoothed together, in other embodiments the latitude and longitude solutions are smoothed separately with separate components.

Figure 2E:
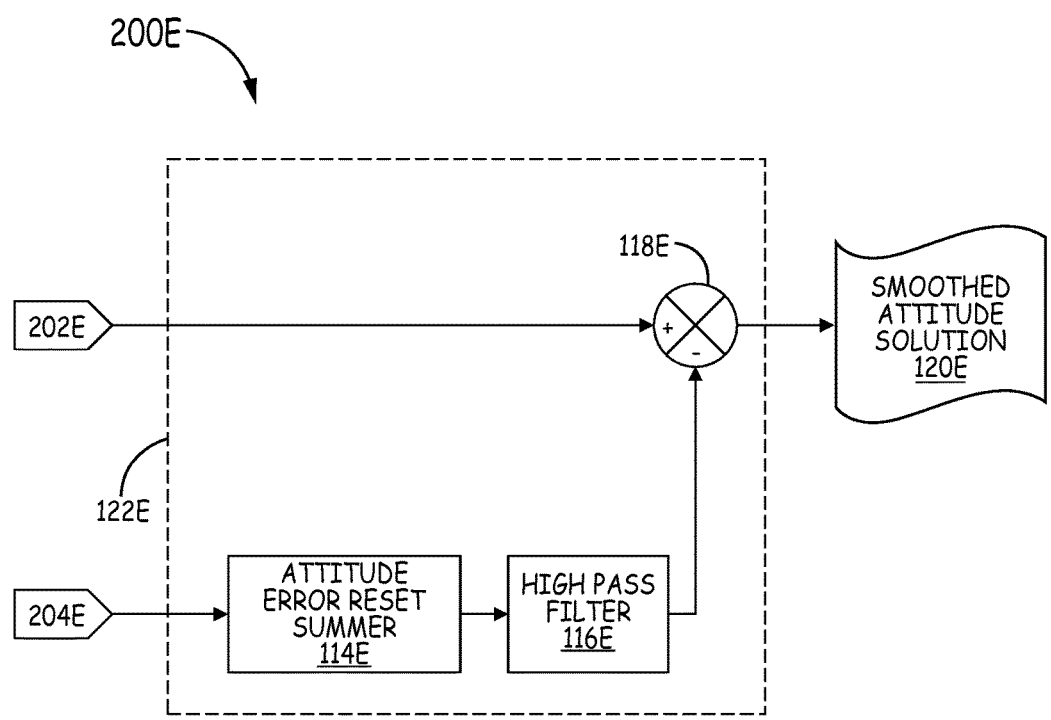

FIG. 2E is a block diagram depicting an exemplary embodiment of an attitude solution smoothing function 122E focused on generating a smoothed attitude solution 120E. Attitude solution smoothing function 122E is configured to receive an un-smoothed attitude solution as a first input 202E and attitude error resets as a second input 204E and is configured to generate the smoothed attitude solution 120E. The unsmoothed attitude solution may be included in the un-smoothed navigation solution 112 described above. Similarly, the attitude error resets may be included in state variable error resets received from a Kalman filter or another source as described above. Attitude solution smoothing function 122E includes attitude error reset summer 114E, high pass filter 116E, summer 118E, and output of the smoothed attitude solution 120E. Attitude error reset summer 114E is configured to receive attitude error resets from second input 204E and to sum the attitude error resets into a cumulative sum of attitude error resets.

In exemplary embodiments, the high pass filter 116E is configured to receive the cumulative sum of attitude error resets from the attitude error reset summer 114E and high pass filters it. In exemplary embodiments, the high pass filter 116E filters out the low frequency data from the cumulative sum of attitude error resets that is changing slowly (and is not likely to be part of a step change in the un-smoothed attitude solution 112E), leaving the information that is changing rapidly (that is likely to be a part of one or more step changes to the un-smoothed attitude solution 112E). In exemplary embodiments, the summer 118E is configured to subtract the high pass filtered cumulative sum of the attitude error resets from the un-smoothed attitude solution received from first input 202E to generate the smoothed attitude solution 120E. The previous high pass filtering of the cumulative sum of the attitude error resets isolated the effects of the attitude error resets that should be removed from the smoothed attitude solution 120E to mitigate the step change in attitude that is present in the un-smoothed attitude solution.

The attitude solution smoothing function 122E described above has the advantages of being able to provide the smoothed attitude solution 120E while minimizing the phase delay introduced by the filtering. This is enabled by the filtering out the high frequency attitude error resets from the un-smoothed attitude solution 112E without filtering the entire un-smoothed attitude solution 112E. Accordingly, only the abrupt step changes and/or resets in the Kalman filtered solution are filtered out in the smoothed attitude solution 120E, while there are other dynamics of the attitude of the navigation system that will not be delayed or have a phase delay associated with them. This enables the smoothed attitude solution 120E generated by the attitude solution smoothing function 122E to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed attitude solution 120E is used with a vehicle's autopilot system to smooth out the autopilot's response to changes in the navigation solution. This enables the autopilot to accurately respond to changes and/or corrections in the attitude solution data without commanding a vehicle to perform an abrupt maneuver. In exemplary embodiments, the smoothed attitude solution 120E is used to control where a seeker is pointed or to help steer a GNSS receiver to better track GNSS signals. In exemplary embodiments, the speed at which the smoothed attitude solution 120E converges to the un-smoothed attitude solution 112E can be adjusted by a user.

Figure 3A:
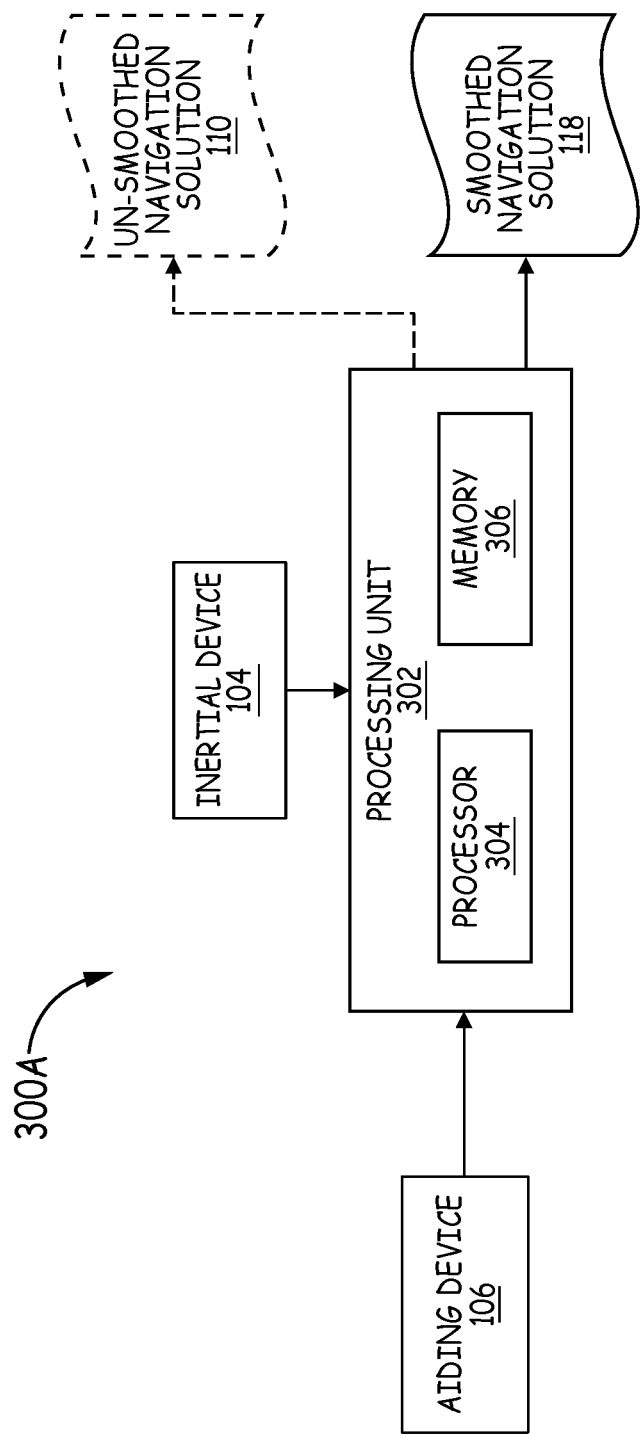
FIGS. 3A-3C are block diagrams depicting additional exemplary embodiments of navigation systems according to the present disclosure.
Figure 3B:
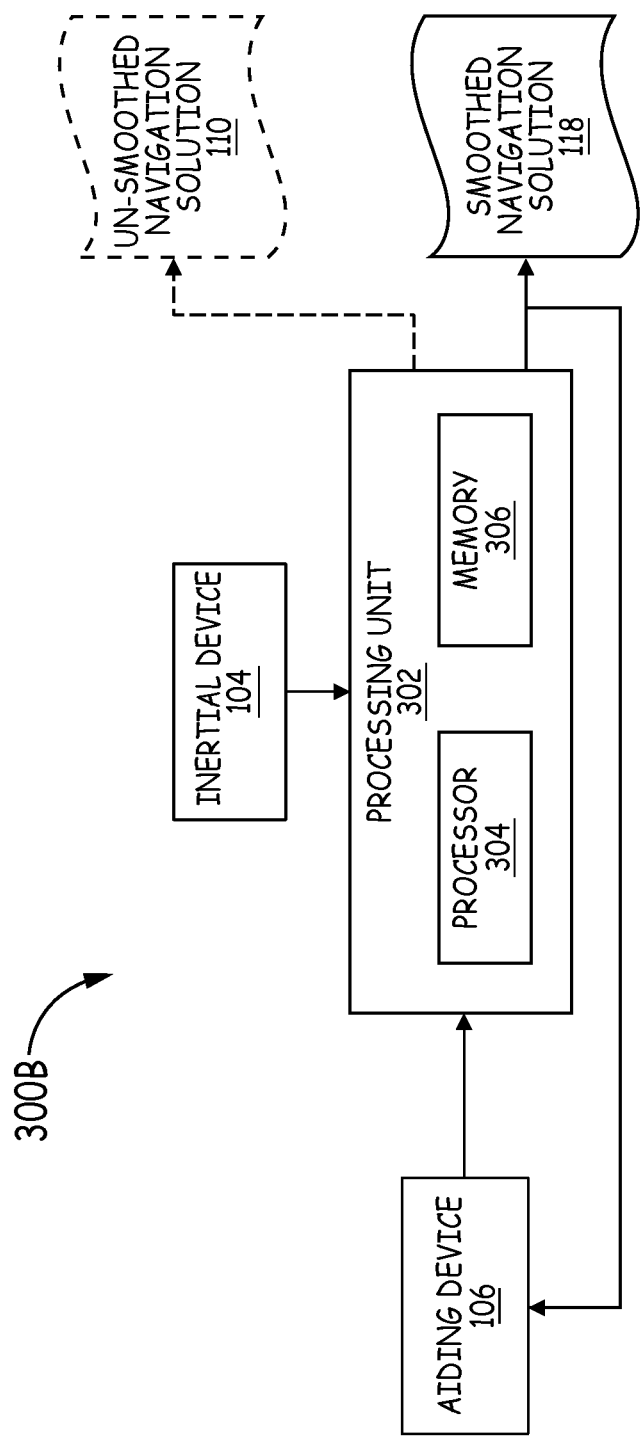
Figure 3C:
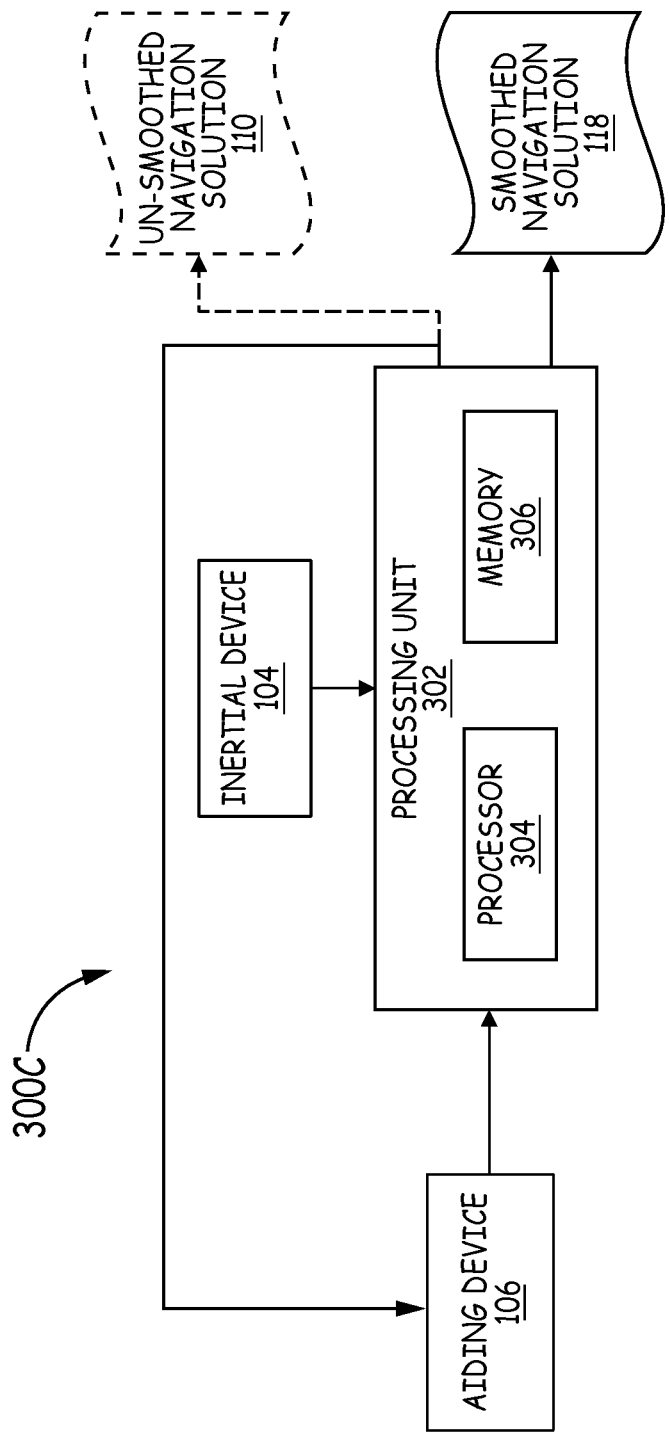

FIGS. 3A-3C are block diagrams depicting exemplary embodiments of navigation systems 300. While any of navigation systems 300 may be implemented on aircraft (including jets, planes, helicopters, blimps, and balloons), they can also be implemented onboard other vehicles, such as space vehicles, sea vessels (including ships and submersibles), and ground vehicles; missiles, rockets, and other ballistics and projectiles; integrated into systems worn by individuals on ground, in structures or caverns, in air, on or in water, or in space; integrated into buildings, other structures, and/or caverns; or integrated in other ways and for other uses. Each of FIGS. 3A-3C illustrates a different embodiment of navigation system 300, labeled 300A-300C respectively.

FIG. 3A is a block diagram depicting an exemplary embodiment of a navigation system 300A. Navigation system 300A includes a processing unit 302, the inertial device 104, the aiding device 106, the optional output of an un-smoothed navigation solution 112, and the output of a smoothed navigation solution 120. The processing unit 302 includes a processor 304 and memory 306 and is configured to implement the functionality of the navigation solution smoothing function 122 and the navigation solution generation function 124 of navigation system 100A shown in FIG. 1A and described above.

In exemplary embodiments, the aiding device 106 is configured to receive signals regarding the position of the system and is configured to generate aiding device measurement data pertaining to the navigation system 300A. In exemplary embodiments, the aiding device 106 includes at least one of a global navigation satellite system (GNSS) receiver, a magnetometer, a pressure sensor, a master inertial navigation system, a Doppler radar receiver, LOng RAnge Navigation (LORAN) based positioning receiver, etc. Aiding device 106 is configured to supply the aiding device measurement data to the processing unit 302. Similarly, inertial device 104 is configured to detect motion of the navigation system 300A and to generate inertial data regarding the motion of the navigation system 300A. In exemplary embodiments, the inertial device 104 includes any combination of gyroscopes and accelerometers to detect linear and/or rotational motion.

To implement the navigation solution generation function 124, processing unit 302 is configured to receive the aiding device measurement data from the aiding device 106 and the inertial data from the inertial device 104. Processing unit 302 is further configured to subtract a previous un-smoothed navigation solution 112 from the aiding device measurement data to determine error measurements between the aiding device measurement data supplied by the aiding device 106 and the previously calculated un-smoothed navigation solution 112. Processing unit 302 is further configured to generate state variable error resets based on the error measurements between the aiding device measurement data supplied by the aiding device 106 and the previously calculated un-smoothed navigation solution 112. In exemplary embodiments, the state variable error resets include at least one of a velocity error reset, an altitude error reset, a latitude and longitude error reset, and an attitude error reset. Processing unit 302 is further configured to calculate the un-smoothed navigation solution 112 based on the inertial data received from the inertial device 104 and the generated state variable error resets, the un-smoothed navigation solution inclusive of the navigation state error resets.

To implement the navigation solution smoothing function 122, processing unit 302 is configured to sum the generated state variable error resets into a cumulative sum of the state variable error resets. In exemplary embodiments, the state variable resets include at least one of a velocity error reset, an altitude error reset, a latitude and longitude error reset, and an attitude error reset. In exemplary embodiments, the different types of state variable error resets are summed independent of each other to create various cumulative sums of state variable error resets. In exemplary embodiments, the different types of state variable error resets are summed simultaneously. In exemplary embodiments, the processing unit 302 is configured to generate at least one of a cumulative sum of velocity error resets, a cumulative sum of altitude error resets, a cumulative sum of latitude and longitude error resets, and a cumulative sum of attitude error resets.

To further implement the navigation solution smoothing function 122, the processing unit 302 is further configured to high pass filter the cumulative sum of state variable error resets and/or the cumulative sum of velocity error resets, the cumulative sum of altitude error resets, the cumulative sum of latitude and longitude error resets, and the cumulative sum of attitude error resets. In exemplary embodiments, high pass filtering filters out the low frequency data that is changing slowly (and is not likely to be part of a step change in the un-smoothed navigation solution 112), leaving the information that is changing rapidly (that is likely to be a part of one or more step changes to the un-smoothed navigation solution 112). Thus, high pass filtering allows the state variable error resets that are changing fairly rapidly to pass through and filters out the state variable error resets that are not changing rapidly. In exemplary embodiments, high pass filtering includes various sub-filtering of individual types of cumulative state variable error resets, including the cumulative sum of velocity error resets, the cumulative sum of altitude error resets, the cumulative sum of latitude and longitude error resets, and the cumulative sum of attitude error resets.

To further implement the navigation solution smoothing function 122, the processing unit 302 is further configured to subtract the high pass filtered cumulative sum of the variable error resets from the un-smoothed navigation solution 112 to generate the smoothed navigation solution 120. In exemplary embodiments, the processing unit 302 is configured to subtract the different components of the variable error resets from the corresponding components of the un-smoothed navigation solution 112 to generate various components of the smoothed navigation solution 120, including subtracting at least one of the cumulative sum of velocity error resets from the velocity component of the un-smoothed navigation solution 112 to generate the velocity component of the smoothed navigation solution 120, the cumulative sum of altitude error resets from the altitude component of the un-smoothed navigation solution 112 to generate the altitude component of the smoothed navigation solution 120, the cumulative sum of latitude and longitude error resets from the latitude and longitude component of the un-smoothed navigation solution 112 to generate the latitude and longitude component of the smoothed navigation solution 120, and the cumulative sum of attitude error resets from the attitude component of the un-smoothed navigation solution 112 to generate the velocity component of the smoothed navigation solution 120.

Un-smoothed navigation solution 112 and smoothed navigation solution 120 generated by the navigation system 300A may include any type of navigation solution, including a velocity solution, an altitude solution, a latitude and longitude solution, and an attitude solution and any combinations or derivatives thereof. In exemplary embodiments, the un-smoothed navigation solution 112 and the smoothed navigation solution 120 include a single type of navigation solution. In other exemplary embodiments, the un-smoothed navigation solution 112 and the smoothed navigation solution 120 include a plurality of types of navigation solutions.

The navigation system 300A described above has the advantages of being able to provide the smoothed navigation solution 120 while minimizing the phase delay introduced by the filtering. This is enabled by the filtering out the high frequency state variable error resets from the un-smoothed navigation solution 112 without filtering the entire un-smoothed navigation solution 112. Accordingly, only the abrupt step changes and/or resets in the Kalman filtered solution are filtered out in the smoothed navigation solution 120, while there are other dynamics of the movement of the navigation system 100A that will not be delayed or have a phase delay associated with them. This enables the smoothed navigation solution 120 generated by the navigation system 300A to eventually converge with the un-smoothed navigation solution 112, just less abruptly.

In exemplary embodiments, the smoothed navigation solution 120 is provided to a user to smooth out the step changes that would otherwise be present in the un-smoothed navigation solution 112. In exemplary embodiments, the smoothed navigation solution 120 is used with a vehicle's autopilot system to smooth out the autopilot's response to changes in the navigation solution. This enables the autopilot to accurately respond to changes and/or corrections in the navigation solution data without commanding a vehicle to perform an abrupt maneuver. In exemplary embodiments, the smoothed navigation solution 120 is used to control where a seeker is pointed or to help steer a GNSS receiver to better track GNSS signals. In exemplary embodiments, the speed at which the smoothed navigation solution 120 converges to the un-smoothed navigation solution can be adjusted by a user.

FIG. 3B is a block diagram depicting an exemplary embodiment of a navigation system 300B. Navigation system 300B includes a processing unit 302, the inertial device 104, the aiding device 106, the optional output of the un-smoothed navigation solution 112, and the output of the smoothed navigation solution 120. The processing unit 302 includes the processor 304 and the memory 306 and is configured to implement the functionality of the navigation solution smoothing function 122 and the navigation solution generation function 124 of navigation system 100B shown in FIG. 1B and described above. Navigation system 300B includes similar components to navigation system 300A and operates according to similar principles and methods as navigation system 300A described above. The difference between navigation system 300B and navigation system 300A is that navigation system 300B includes feedback of the smoothed navigation solution 120 to the aiding device 106.

In exemplary embodiments, the aiding device 106 is configured to receive the smoothed navigation solution 120 and to use the smoothed navigation solution 120 to aid in generating aiding device measurement data based on the position of the system. In exemplary embodiments, use of the smoothed navigation solution 120 by the aiding device 106 minimizes the chance that the aiding device 106 will lose lock within its loops based on a step change that may be present in the un-smoothed navigation solution 112.

FIG. 3C is a block diagram depicting an exemplary embodiment of a navigation system 300C. Navigation system 300C includes a processing unit 302, the inertial device 104, the aiding device 106, the optional output of the un-smoothed navigation solution 112, and the output of the smoothed navigation solution 120. The processing unit 302 includes the processor 304 and the memory 306 and is configured to implement the functionality of the navigation solution smoothing function 122 and the navigation solution generation function 124 of navigation system 100C shown in FIG. 1C and described above. Navigation system 300C includes similar components to navigation system 300A and operates according to similar principles and methods as navigation system 300A described above. The difference between navigation system 300C and navigation system 300A is that navigation system 300C includes feedback of the un-smoothed navigation solution 112 to the aiding device 106.

In exemplary embodiments, the aiding device 106 is configured to receive the un-smoothed navigation solution 112 and to use the un-smoothed navigation solution 112 to aid in generating aiding device measurement data based on the position, velocity, and/or orientation of the system. In exemplary embodiments, use of the un-smoothed navigation solution 112 instead of the smoothed navigation solution 120 by the aiding device 106 will not as effectively minimize the chance that the aiding device 106 will lose lock within its loops based on a step change present in the un-smoothed navigation solution 112.

Figure 4:
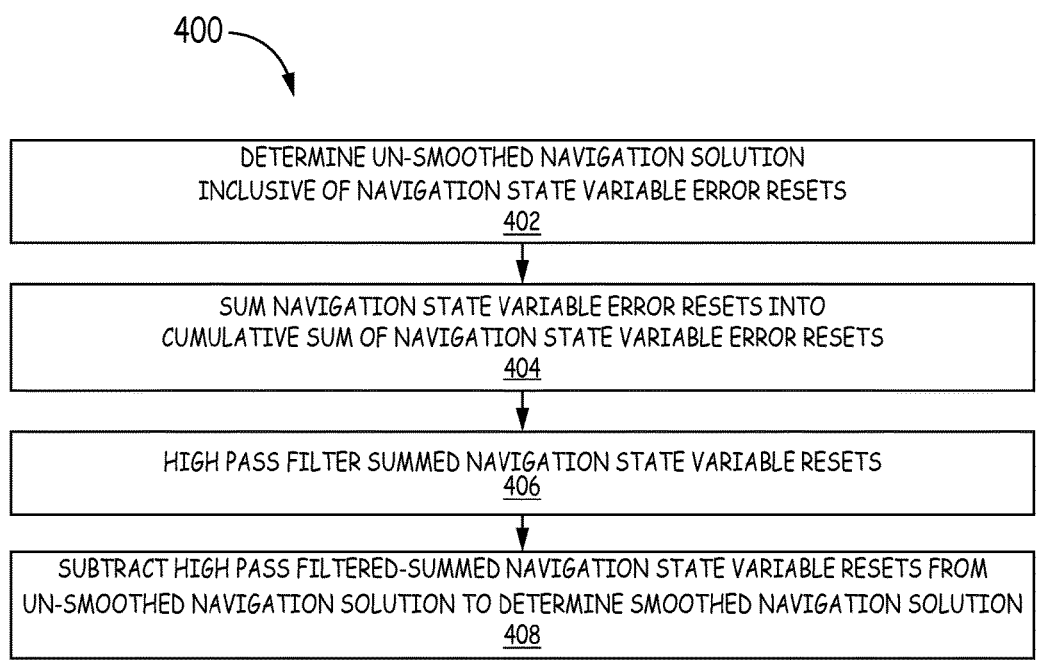
FIG. 4 is a flow diagram depicting an exemplary embodiment of a method according to the present disclosure.

FIG. 4 is a flow diagram depicting an exemplary method 400. Exemplary method 400 begins at block 402 with determining an un-smoothed navigation solution inclusive of navigation state variable error resets. In exemplary embodiments, determining the un-smoothed navigation solution inclusive of navigation state error resets is based on aiding device measurement data provided by an aiding device and inertial data provided by an inertial device. In exemplary embodiments, determining the un-smoothed navigation solution includes subtracting a previously calculated un-smoothed navigation solution from the aiding device measurement data to determine error measurements between the aiding device measurement data and the previously calculated un-smoothed navigation solution; generating state variable error resets based on the error measurements between the aiding device measurement data and the previously calculated navigation solution; and generating the un-smoothed navigation solution inclusive of navigation state variable error resets based on the inertial data and the aiding device measurement data by calculating the un-smoothed navigation solution based on the inertial data and the state variable error resets. In exemplary embodiments, the un-smoothed navigation solution includes at least one of a velocity solution, an altitude solution, a latitude solution, a longitude solution, and an attitude solution.

Exemplary method 400 proceeds to block 404 with summing navigation state variable error resets into a cumulative sum of the navigation state variable error resets. In exemplary embodiments, the navigation state variable error resets includes at least one of a velocity error reset, an altitude error reset, a latitude and longitude error reset, and an attitude error reset. In exemplary embodiments, summing navigation state variable error resets into a cumulative sum of the state variable error resets includes summing at least one of the velocity error resets, the altitude error resets, the latitude and longitude error resets, and the attitude error resets.

Exemplary method 400 proceeds to block 406 with high pass filtering the cumulative sum of the state variable error resets. In exemplary embodiments, high pass filtering the cumulative sum of the state variable error resets includes high pass filtering at least one of a cumulative sum of velocity error resets, a cumulative sum of altitude error resets, a cumulative sum of latitude and longitude error resets, and a cumulative sum of attitude error resets. In exemplary embodiments, high pass filtering filters out the low frequency data that is changing slowly (and is not likely to be part of a step change in the un-smoothed navigation solution), leaving the information that is changing rapidly (that is likely to be a part of one or more step changes to the un-smoothed navigation solution). Thus, high pass filtering allows the state variable error resets that are changing fairly rapidly to pass through and filters out the state variable error resets that are not changing rapidly. In exemplary embodiments, high pass filtering includes various sub-filtering of individual types of cumulative state variable error resets, including the cumulative sum of velocity error resets, the cumulative sum of altitude error resets, the cumulative sum of latitude and longitude error resets, and the cumulative sum of attitude error resets.

Exemplary method 400 proceeds to block 408 with subtracting the high pass filtered cumulative sum of the state variable error resets from the un-smoothed navigation solution to generate a smoothed navigation solution. The previous high pass filtering of the cumulative sum of the state variable error resets isolated the effects of the error resets that should be removed from the un-smoothed navigation solution to mitigate the step change that is present in the un-smoothed navigation solution. Thus, the smoothed navigation solution will not include the fast changing data caused by the resets that is present in the un-smoothed navigation solution any thusly will not have large step changes. Still, even with filtering of these resets, the smoothed navigation solution (that responds more gradually to the state variable error resets) will eventually converge with the un-filtered navigation solution (that responds more quickly to the state variable error resets).

In exemplary embodiments, the smoothed navigation solution includes at least one of a velocity solution, an altitude solution, a latitude solution, a longitude solution, and an attitude solution. In exemplary embodiments, subtracting at block 408 includes subtracting the different components of variable error resets from the corresponding components of the un-smoothed navigation solution. This may include subtracting at least one of the cumulative sum of velocity error resets from the velocity component of the un-smoothed navigation solution to generate the velocity component of the smoothed navigation solution, the cumulative sum of altitude error resets from the altitude component of the un-smoothed navigation solution to generate the altitude component of the smoothed navigation solution, the cumulative sum of latitude and longitude error resets from the latitude and longitude component of the un-smoothed navigation solution to generate the latitude and longitude component of the smoothed navigation solution, and the cumulative sum of attitude error resets from the attitude component of the un-smoothed navigation solution to generate the velocity component of the smoothed navigation solution.

Method 400 has the advantages of being able to provide the smoothed navigation solution while minimizing the phase delay introduced by the filtering. This is enabled by the filtering out the high frequency state variable error resets from the un-smoothed navigation solution without filtering the entire un-smoothed navigation solution. Accordingly, only the abrupt step changes and/or resets in the Kalman filtered solution are filtered out in the smoothed navigation solution, while there are other dynamics of the movement of the navigation system that will not be delayed or have a phase delay associated with them. This enables the smoothed navigation solution generated by method 400 to eventually converge with the un-smoothed navigation solution, just less abruptly.

In exemplary embodiments, the smoothed navigation solution generated by method 400 is provided to a user to smooth out the step changes that would otherwise be present in the un-smoothed navigation solution. In exemplary embodiments, the smoothed navigation solution is used with a vehicle's autopilot system to smooth out the autopilot's response to changes in the navigation solution. This enables the autopilot to accurately respond to changes and/or corrections in the navigation solution data without commanding a vehicle to perform an abrupt maneuver. In exemplary embodiments, the smoothed navigation solution is used to control where a seeker is pointed or to help steer a GNSS receiver to better track GNSS signals. In exemplary embodiments, the speed at which the smoothed navigation converges to the un-smoothed navigation solution can be adjusted by a user.

In exemplary embodiments including the aiding device, method 400 further includes receiving the smoothed navigation solution at the aiding device; and generating the aiding device measurement data based on signals regarding the position, the velocity, and/or the orientation of the system and the smoothed navigation solution received at the aiding device. In exemplary embodiments including the aiding device, method 400 further includes receiving the un-smoothed navigation solution at the aiding device; and generating the aiding device measurement data based on signals regarding the position, the velocity, and/or the orientation of the system and the un-smoothed navigation solution received at the aiding device. In exemplary embodiments including the aiding device, the aiding device 106 includes at least one of a global navigation satellite system (GNSS) receiver, a magnetometer, a pressure sensor, a master inertial navigation system, a Doppler radar receiver, LOng RAnge Navigation (LORAN) based positioning receiver, etc.

As used in this description, a processing device or unit (such as, but not limited to, processing unit 302 or processor 304 described above and shown in FIGS. 3A-3C) includes or functions with software programs, firmware or other computer readable instructions for carrying out various methods, process tasks, calculations, and control functions, used in any of navigation systems 300A-300C. These instructions are typically stored on any appropriate computer readable medium (such as, but not limited to, memory 306) used for storage of computer readable instructions or data structures. The computer readable medium can be implemented as any available media that can be accessed by a general purpose or special purpose computer or processor, or any programmable logic device. Suitable processor-readable media may include non-transitory storage or memory media such as magnetic or optical media. For example, non-transitory storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a navigation system comprising: at least one inertial sensor configured to detect motion of the system and generate inertial data; at least one aiding device configured to generate aiding device measurement data; at least one processing unit configured to generate an un-smoothed navigation solution inclusive of navigation state variable error resets based on the inertial data and the aiding device measurement data; wherein the at least one processing unit is further configured to sum the state variable error resets into a cumulative sum of the state variable error resets; wherein the at least one processing unit is further configured to high pass filter the cumulative sum of the state variable error resets; and wherein the at least one processing unit is further configured to subtract the high pass filtered cumulative sum of the state variable error resets from the un-smoothed navigation solution to generate a smoothed navigation solution.

Example 2 includes the system of Example 1, wherein the at least one processing unit is further configured to subtract a previously calculated un-smoothed navigation solution from the aiding device measurement data to determine error measurements between the aiding device measurement data supplied by the aiding device and the previously calculated un-smoothed navigation solution; wherein the at least one processing unit is further configured to generate state variable error resets based on the error measurements between the aiding device measurement data and the previously calculated navigation solution; and wherein the at least one processing unit is further configured to generate the un-smoothed navigation solution inclusive of navigation state variable error resets based on the inertial data and the aiding device measurement data by calculating the un-smoothed navigation solution based on the inertial data and the state variable error resets.

Example 3 includes the system of Example 2, wherein the un-smoothed navigation solution is fed back to the aiding device as the previously calculated navigation solution.

Example 4 includes the system of any of Examples 1-3, wherein the aiding device includes at least one of a global navigation satellite system (GNSS) receiver, a magnetometer, a pressure sensor, a master inertial navigation system, a Doppler radar receiver, and LOng RAnge Navigation (LORAN) based positioning receiver; and wherein the aiding device measurement data comprises at least one of position data, position data, velocity data, heading data, and orientation data.

Example 5 includes the system of any of Examples 1-4, wherein the aiding device is further configured to receive the smoothed navigation solution and to use the smoothed navigation solution to aid in generating the aiding device measurement data.

Example 6 includes the system of any of Examples 1-5, wherein the aiding device is further configured to receive the un-smoothed navigation solution and to use the smoothed navigation solution to aid in generating the aiding device measurement data.

Example 7 includes the system of any of Examples 1-6, wherein each of the un-smoothed navigation solution and the smoothed navigation solution includes at least one of a velocity solution, an altitude solution, a latitude and longitude solution, and an attitude solution; wherein the navigation state variable error resets includes at least one of a velocity error reset, an altitude error reset, a latitude and longitude error reset, and an attitude error reset; wherein the at least one processing unit is configured to sum at least one of velocity error resets into a cumulative sum of velocity error resets, altitude error resets into a cumulative sum of altitude error resets, latitude and longitude error resets into a cumulative sum of latitude and longitude error resets, and attitude error resets into a cumulative sum of attitude error resets; and wherein the at least one processing unit is configured to subtract at least one of the high pass filtered cumulative sum of velocity error resets, the high pass filtered cumulative sum of altitude error resets, the high pass filtered cumulative sum of latitude and longitude error resets, and the high pass filtered cumulative sum of attitude error resets from at least one of a corresponding velocity solution, altitude solution, latitude and longitude solution, and attitude solution.

Example 8 includes a method comprising: determining an un-smoothed navigation solution inclusive of navigation state error resets; summing navigation state variable error resets into a cumulative sum of the state variable error resets; high pass filtering the cumulative sum of the state variable error resets; and subtracting the high pass filtered cumulative sum of the state variable error resets from the un-smoothed navigation solution to generate a smoothed navigation solution.

Example 9 includes the method of Example 8, wherein determining the un-smoothed navigation solution inclusive of navigation state error resets is based on aiding device measurement data provided by an aiding device and inertial data provided by an inertial device.

Example 10 includes the method of Example 9, wherein determining an un-smoothed navigation solution inclusive of navigation state error resets includes: subtracting a previously calculated un-smoothed navigation solution from the aiding device measurement data to determine error measurements between the aiding device measurement data and the previously calculated un-smoothed navigation solution; generating navigation state variable error resets based on the error measurements between the aiding device measurement data and the previously calculated navigation solution; and generating the un-smoothed navigation solution inclusive of navigation state variable error resets based on the inertial data and the aiding device measurement data by calculating the un-smoothed navigation solution based on the inertial data and the state variable error resets.

Example 11 includes the method of any of Examples 9-10, further comprising receiving the smoothed navigation solution at the aiding device; and generating the aiding device measurement data based on signals regarding at least one of a position, a location, a velocity, a heading, and an orientation of the system and the smoothed navigation solution received at the aiding device.

Example 12 includes the method of any of Examples 9-11, further comprising receiving the un-smoothed navigation solution at the aiding device; and generating the aiding device measurement data based on signals regarding at least one of a position, a location, a velocity, a heading, and an orientation of the system and the un-smoothed navigation solution received at the aiding device.

Example 13 includes the method of any of Examples 9-12, wherein the aiding device includes at least one of a global navigation satellite system (GNSS) receiver, a magnetometer, a pressure sensor, a master inertial navigation system, a Doppler radar receiver, LOng RAnge Navigation (LORAN) based positioning receiver; and wherein the aiding device measurement data comprises at least one of position data, location data, velocity data, heading data, and orientation data.

Example 14 includes the method of any of Examples 8-13, wherein each of the un-smoothed navigation solution and the smoothed navigation solution includes at least one of a velocity solution, an altitude solution, a latitude and longitude solution, and an attitude solution; wherein the navigation state variable error resets includes at least one of velocity error resets, altitude error resets; latitude and longitude error resets; and attitude error resets; wherein summing navigation state variable error resets into a cumulative sum of the state variable error resets includes summing at least one of the velocity error resets, the altitude error resets, the latitude and longitude error resets, and the attitude error resets; wherein high pass filtering the cumulative sum of the state variable error resets includes high pass filtering at least one of a cumulative sum of velocity error resets, a cumulative sum of altitude error resets, a cumulative sum of latitude and longitude error resets, and a cumulative sum of attitude error resets.

Example 15 includes a navigation system comprising: at least one inertial sensor configured to detect motion of the system and generate inertial data based on the detected motion of the system; at least one aiding device configured to supply aiding device measurement data based on at least one of a position, a location, a velocity, a heading, and an orientation of the system; at least one Kalman filter configured to generate state variable error resets based on error measurements between the aiding device measurement data supplied by the aiding device and a previously calculated navigation solution; at least one navigator configured to receive inertial data from the at least one inertial sensor and the state variable error resets from the at least one Kalman filter, the at least one navigator further configured to calculate an un-smoothed navigation solution based on the inertial data and the state variable error resets, the un-smoothed navigation solution inclusive of the navigation state error resets; a state variable error reset summer configured receive the state variable resets and to sum the state variable error resets into a cumulative sum of state variable error resets; a high pass filter configured to high pass filter the cumulative sum of state variable error resets; and a first summer configured to subtract the high pass filtered cumulative sum of the state variable error resets from the un-smoothed navigation solution to generate a smoothed navigation solution.

Example 16 includes the system of Example 15, wherein the un-smoothed navigation solution is fed back as the previously calculated navigation solution.

Example 17 includes the system of any of Examples 15-16, further comprising: a second summer configured to generate the error measurements between the aiding device measurement data supplied by the aiding device and the previously calculated navigation solution by subtracting the previously calculated navigation solution from the aiding device measurement data.

Example 18 includes the system of any of Examples 15-17, wherein the aiding device includes at least one of a global navigation satellite system (GNSS) receiver, a magnetometer, a pressure sensor, a master inertial navigation system, a Doppler radar receiver, LOng RAnge Navigation (LORAN) based positioning receiver; and wherein the aiding device measurement data comprises at least one of position data, location data, velocity data, heading data, and orientation data.

Example 19 includes the system of any of Examples 15-18, wherein each of the un-smoothed navigation solution and the smoothed navigation solution includes at least one of a velocity solution, an altitude solution, a latitude and longitude solution, and an attitude solution; wherein the navigation state variable error resets includes at least one of a velocity error reset, an altitude error reset; a latitude and longitude error reset; and an attitude error reset; wherein the state variable error reset summer includes at least one of a velocity error reset summer; an altitude error reset summer; a latitude and longitude error reset summer; and an attitude error reset summer; and wherein the high pass filter is configured to high pass filter at least one of a cumulative sum of velocity error resets, a cumulative sum of altitude error resets, a cumulative sum of latitude and longitude error resets, and a cumulative sum of attitude error resets.

Example 20 includes the system of any of Examples 15-19, wherein the aiding device is further configured to receive the smoothed navigation solution and to use the smoothed navigation solution to aid in supplying the aiding device measurement data.

What is claimed is:

1. A navigation system comprising:
   at least one inertial sensor configured to detect motion of the system and generate inertial data;
   at least one aiding device configured to generate aiding device measurement data;
   at least one processing unit configured to generate an un-smoothed navigation solution based on the inertial data and the aiding device measurement data, the un-smoothed navigation solution inclusive of state variable error resets for a state variable;
   wherein the at least one processing unit is further configured to sum the state variable error resets for the state variable into a cumulative sum of the state variable error resets for the state variable;

wherein the at least one processing unit is further configured to high pass filter the cumulative sum of the state variable error resets for the state variable;

wherein the at least one processing unit is further configured to subtract the high pass filtered cumulative sum of the state variable error resets for the state variable from the un-smoothed navigation solution to generate a smoothed navigation solution; and wherein the at least one processing unit is configured to provide the smoothed navigation solution to at least one of:
- an autopilot system configured to use the smoothed navigation solution to smooth out a response of the autopilot system to changes in the navigation solution;
- a global navigation satellite system (GNSS) receiver configured to use the smoothed navigation solution to help steer the GNSS receiver to better track GNSS signals; and
- a seeker configured to use the smoothed navigation solution to control where the seeker is pointed.

2. The system of claim 1, wherein the un-smoothed navigation solution is fed back to the at least one processing unit as a previously calculated un-smoothed navigation solution.

3. The system of claim 2, wherein the at least one processing unit is further configured to subtract the previously calculated un-smoothed navigation solution from the aiding device measurement data to determine error measurements between the aiding device measurement data supplied by the aiding device and the previously calculated un-smoothed navigation solution;

wherein the at least one processing unit is further configured to generate state variable error resets for the state variable based on the error measurements between the aiding device measurement data and the previously calculated un-smoothed navigation solution; and wherein the at least one processing unit is further configured to generate the un-smoothed navigation solution inclusive of state variable error resets for the state variable based on the inertial data and the aiding device measurement data by calculating the un-smoothed navigation solution based on the inertial data and the state variable error resets for the state variable.

4. The system of claim 1, wherein the aiding device includes at least one of a global navigation satellite system (GNSS) receiver, a magnetometer, a pressure sensor, a master inertial navigation system, a Doppler radar receiver, and LOng RAnge Navigation (LORAN) based positioning receiver; and wherein the aiding device measurement data comprises at least one of position data, location data, velocity data, heading data, and orientation data.

5. The system of claim 1, wherein the aiding device is further configured to receive the smoothed navigation solution and to use the smoothed navigation solution to aid in generating the aiding device measurement data.

6. The system of claim 1, wherein the aiding device is further configured to receive the un-smoothed navigation solution and to use the un-smoothed navigation solution to aid in generating the aiding device measurement data.

7. The system of claim 1, wherein each of the un-smoothed navigation solution and the smoothed navigation solution includes at least one of a velocity solution, an altitude solution, a latitude and longitude solution, and an attitude solution;

wherein the state variable error resets includes at least one of a velocity error reset, an altitude error reset, a latitude and longitude error reset, and an attitude error reset;

wherein the at least one processing unit is configured to sum at least one of velocity error resets into a cumulative sum of velocity error resets, altitude error resets into a cumulative sum of altitude error resets, latitude and longitude error resets into a cumulative sum of latitude and longitude error resets, and attitude error resets into a cumulative sum of attitude error resets; and wherein the at least one processing unit is configured to subtract at least one of the high pass filtered cumulative sum of velocity error resets, the high pass filtered cumulative sum of altitude error resets, the high pass filtered cumulative sum of latitude and longitude error resets, and the high pass filtered cumulative sum of attitude error resets from at least one of a corresponding velocity solution, altitude solution, latitude and longitude solution, and attitude solution.

8. A method of generating a smoothed navigation solution for a vehicle comprising:
generating state variable error resets for a state variable based on aiding device measurement data provided by an aiding device and inertial data provided by an inertial device onboard a vehicle using at least one processing unit onboard the vehicle;
determining an un-smoothed navigation solution inclusive of the state variable error resets for the state variable using the at least one processing unit onboard the vehicle;
summing the state variable error resets for the state variable into a cumulative sum of the state variable error resets for the state variable using the at least one processing unit onboard the vehicle;
high pass filtering the cumulative sum of the state variable error resets for the state variable using the at least one processing unit onboard the vehicle; and
subtracting the high pass filtered cumulative sum of the state variable error resets for the state variable from the un-smoothed navigation solution to generate a smoothed navigation solution using the at least one processing unit onboard the vehicle; and
providing the smoothed navigation solution to at least one of:
- an autopilot system configured to use the smoothed navigation solution to smooth out a response of the autopilot system to changes in the navigation solution;
- a global navigation satellite (GNSS) receiver configured to use the smoothed navigation solution to help steer the GNSS receiver to better track GNSS signals; and
- a seeker configured to use the smoothed navigation solution to control where the seeker is pointed.

9. The method of claim 8, wherein the un-smoothed navigation solution is fed back as a previously calculated un-smoothed navigation solution to be used in generating the state variable error resets for the state variable, wherein the un-smoothed navigation solution is indirectly based on the aiding device measurement data provided by the aiding device through the state variable error resets for the state variable and directly based on the inertial data provided by the inertial device.

10. The method of claim 9, wherein generating the state variable error resets for the state variable includes:

subtracting the previously calculated un-smoothed navigation solution from the aiding device measurement data to determine error measurements between the aiding device measurement data and the previously calculated un-smoothed navigation solution; and generating the state variable error resets for the state variable based on the error measurements between the aiding device measurement data and the previously calculated un-smoothed navigation solution; and wherein determining the un-smoothed navigation solution inclusive of state variable error resets for the state variable using at least one processing unit onboard the vehicle includes:

generating the un-smoothed navigation solution inclusive of state variable error resets for the state variable using the at least one processing unit based on the inertial data and the aiding device measurement data by calculating the un-smoothed navigation solution based on the inertial data and the state variable error resets.

11. The method of claim 8, further comprising receiving the smoothed navigation solution at the aiding device; and generating the aiding device measurement data based on signals regarding at least one of a position, a location, a velocity, a heading, and an orientation of the system and the smoothed navigation solution received at the aiding device.

12. The method of claim 8, further comprising receiving the un-smoothed navigation solution at the aiding device; and generating the aiding device measurement data based on signals regarding at least one of a position, a location, a velocity, a heading, and an orientation of the system and the un-smoothed navigation solution received at the aiding device.

13. The method of claim 8, wherein the aiding device includes at least one of a global navigation satellite system (GNSS) receiver, a magnetometer, a pressure sensor, a master inertial navigation system, a Doppler radar receiver, LOng RAnge Navigation (LORAN) based positioning receiver; and wherein the aiding device measurement data comprises at least one of position data, location data, velocity data, heading data, and orientation data.

14. The method of claim 8, wherein each of the un-smoothed navigation solution and the smoothed navigation solution includes at least one of a velocity solution, an altitude solution, a latitude and longitude solution, and an attitude solution;

wherein the state variable error resets includes at least one of velocity error resets, altitude error resets; latitude and longitude error resets; and attitude error resets;

wherein summing state variable error resets into a cumulative sum of the state variable error resets for the state variable includes summing at least one of the velocity error resets, the altitude error resets, the latitude and longitude error resets, and the attitude error resets;

wherein high pass filtering the cumulative sum of the state variable error resets for the state variable includes high pass filtering at least one of a cumulative sum of velocity error resets, a cumulative sum of altitude error resets, a cumulative sum of latitude and longitude error resets, and a cumulative sum of attitude error resets.

15. A navigation system comprising:

at least one inertial sensor configured to detect motion of the system and generate inertial data based on the detected motion of the system;

at least one aiding device configured to supply aiding device measurement data based on at least one of a position, a location, a velocity, a heading, and an orientation of the system;

at least one Kalman filter configured to generate state variable error resets for a state variable based on error measurements between the aiding device measurement data supplied by the aiding device and a previously calculated un-smoothed navigation solution;

at least one navigator configured to receive inertial data from the at least one inertial sensor and the state variable error resets for the state variable from the at least one Kalman filter, the at least one navigator further configured to calculate an un-smoothed navigation solution based on the inertial data and the state variable error resets, the un-smoothed navigation solution inclusive of the state variable error resets for the state variable;

wherein the un-smoothed navigation solution is fed back as the previously calculated un-smoothed navigation solution;

a state variable error reset summer configured to receive the state variable error resets for the state variable and to sum the state variable error resets for the state variable into a cumulative sum of state variable error resets for the state variable;

a high pass filter configured to high pass filter the cumulative sum of state variable error resets for the state variable; and a first summer configured to subtract the high pass filtered cumulative sum of the state variable error resets for the state variable from the un-smoothed navigation solution to generate a smoothed navigation solution; and wherein the at least one processing unit is configured to provide the smoothed navigation solution to at least one of:

an autopilot system configured to use the smoothed navigation solution to smooth out a response of the autopilot system to changes in the navigation solution;

a global navigation satellite (GNSS) receiver configured to use the smoothed navigation solution to help steer the GNSS receiver to better track GNSS signals; and a seeker configured to use the smoothed navigation solution to control where the seeker is pointed.

16. The system of claim 15, further comprising:

a second summer configured to generate the error measurements between the aiding device measurement data supplied by the aiding device and the previously calculated un-smoothed navigation solution by subtracting the previously calculated un-smoothed navigation solution from the aiding device measurement data.

17. The system of claim 15, wherein the aiding device includes at least one of a global navigation satellite system (GNSS) receiver, a magnetometer, a pressure sensor, a master inertial navigation system, a Doppler radar receiver, LOng RAnge Navigation (LORAN) based positioning receiver; and wherein the aiding device measurement data comprises at least one of position data, location data, velocity data, heading data, and orientation data.

18. The system of claim 15, wherein each of the un-smoothed navigation solution and the smoothed navigation solution includes at least one of a velocity solution, an altitude solution, a latitude and longitude solution, and an attitude solution;

wherein the state variable error resets includes at least one of a velocity error reset, an altitude error reset; a latitude and longitude error reset; and an attitude error reset;

wherein the state variable error reset summer includes at least one of a velocity error reset summer; an altitude error reset summer; a latitude and longitude error reset summer; and an attitude error reset summer; and wherein the high pass filter is configured to high pass filter at least one of a cumulative sum of velocity error resets, a cumulative sum of altitude error resets, a cumulative sum of latitude and longitude error resets, and a cumulative sum of attitude error resets.

19. The system of claim 15, wherein the aiding device is further configured to receive the smoothed navigation solution and to use the smoothed navigation solution to aid in supplying the aiding device measurement data.

20. The system of claim 15, wherein the aiding device is further configured to receive the un-smoothed navigation solution and to use the un-smoothed navigation solution to aid in supplying the aiding device measurement data.

* * * * *